(12) United States Patent
Ichikawa et al.

(10) Patent No.: US 10,348,169 B2
(45) Date of Patent: Jul. 9, 2019

(54) ELECTRIC MOTOR WITH BRUSHES ARRANGED AT PREDETERMINED POSITIONS

(71) Applicant: Asmo Co., Ltd., Shizuoka-ken (JP)

(72) Inventors: Tetsuaki Ichikawa, Iwata (JP); Toshio Yamamoto, Kosai (JP); Masayuki Kuwano, Kosai (JP)

(73) Assignee: Denso Corporation, Kariya (JP)

( * ) Notice: Subject to any disclaimer, the term of this patent is extended or adjusted under 35 U.S.C. 154(b) by 38 days.

(21) Appl. No.: 15/425,522

(22) Filed: Feb. 6, 2017

(65) Prior Publication Data
US 2017/0149315 A1 May 25, 2017

Related U.S. Application Data

(62) Division of application No. 14/496,328, filed on Sep. 25, 2014, now abandoned.

(30) Foreign Application Priority Data

Apr. 7, 2014 (JP) .................................. 2014-078884

(51) Int. Cl.
*H02K 13/00* (2006.01)
*H01R 39/04* (2006.01)
(Continued)

(52) U.S. Cl.
CPC ........... *H02K 13/006* (2013.01); *H01R 39/04* (2013.01); *H02K 5/24* (2013.01); *H02K 13/00* (2013.01);
(Continued)

(58) Field of Classification Search
CPC .. H02K 13/006; H02K 13/00; H02K 2213/03; H02K 5/24; H01R 39/04
(Continued)

(56) References Cited

U.S. PATENT DOCUMENTS

| 6,888,285 B2 | 5/2005 | Ito et al. |
| 2003/0137211 A1* | 7/2003 | Ito ........................ H02K 13/10 310/233 |

(Continued)

FOREIGN PATENT DOCUMENTS

| JP | 55-109156 | 8/1980 |
| JP | 3994010 | 10/2007 |

*Primary Examiner* — Michael Andrews
(74) *Attorney, Agent, or Firm* — Patterson Thuente Pedersen, P.A.

(57) ABSTRACT

A brushed motor includes a rotation shaft, a commutator including a plurality of segments separated by a plurality of undercuts arranged at unequal intervals, an armature, a plurality of permanent magnets, a voltage equalizing line, a positive electrode brush, and a negative electrode brush. When Pz is the number of the permanent magnets and N is the number of the segments, a relationship of N=Pz(K−0.5) is satisfied. Pz is an even number that is greater than or equal to four. K is a constant and is a natural number that is greater than or equal to two. The plurality of undercuts includes at least one set of undercuts arranged at an undercut interval that differs from a reference angle θz. The reference angle θz is specified by a relational expression of θz=(360 degrees/Pz)±(360 degrees/2N).

2 Claims, 16 Drawing Sheets

(51) Int. Cl.
*H02K 5/24* (2006.01)
*H02K 13/10* (2006.01)

(52) U.S. Cl.
CPC ......... *H02K 13/10* (2013.01); *H02K 2213/03* (2013.01)

(58) Field of Classification Search
USPC ........................................................ 310/236
See application file for complete search history.

(56) References Cited

U.S. PATENT DOCUMENTS

2011/0198954 A1* 8/2011 Saito ...................... H02K 13/10
310/83
2015/0288119 A1 10/2015 Ichikawa et al.

* cited by examiner

ELECTRIC MOTOR WITH BRUSHES ARRANGED AT PREDETERMINED POSITIONS

RELATED APPLICATION

This application is a division of application Ser. No. 14/496,328 filed Sep. 25, 2014, which claims priority to Japanese Patent Application No. 2014078884, filed Apr. 7, 2014, which are both hereby fully incorporated herein by reference.

BACKGROUND OF THE INVENTION

The present invention relates to a brushed motor.

Conventionally, in a brushed motor, abnormal noise is generated by a force applied to a commutator from a brush during rotation, and the abnormal noise becomes a cause of noise, vibration, and the like. In particular, when the brushed motor is used in an on-board motor, which is required to be quiet, the noise or the like may become a problem.

A commutator has been proposed in which a plurality of segments (commutator pieces) arranged on an outer circumferential surface of the commutator have different circumferential widths so that undercuts (grooves) formed between adjacent segments are not located at equal intervals (e.g., Japanese Patent No. 3994010).

In the motor of Japanese Patent No. 3994010, a positive electrode brush and a negative electrode brush are arranged facing each other. Thus, the positive electrode and negative electrode brushes simultaneously traverse adjacent segments many times during each rotation produced by the motor. The large number of times the positive electrode and negative electrode brushes simultaneously traversing the adjacent segments for each rotation adversely affects the motor characteristics, increases the fluctuation width of the value of the current supplied to a winding, and increases rotation torque fluctuation, vibration, and the abnormal noise.

SUMMARY OF THE INVENTION

It is an object of the present invention to provide a brushed motor capable of reducing the level of abnormal noise generated by the positional relationship of a brush and the undercuts of segments, which are formed at unequal angular intervals.

To achieve the above object, a first aspect of the present invention is a brushed motor including a rotation shaft. A commutator is fixed to the rotation shaft. The commutator includes a plurality of segments insulated and separated by a plurality of undercuts. The plurality of undercuts are arranged at unequal angular intervals about a center axis of the rotation shaft. An armature is fixed to the rotation shaft. A plurality of permanent magnets are located at an outer side of the armature. The plurality of permanent magnets are arranged at equal intervals so that directions of magnetic poles differ in adjacent ones of the permanent magnets. A voltage equalizing line connects different ones of the segments. A positive electrode brush and a negative electrode brush are arranged on an outer circumference of the commutator at positions that are not facing each other. When Pz is the number of the permanent magnets and N is the number of the segments, a relationship of $N=Pz(K-0.5)$ is satisfied, where Pz is an even number that is greater than or equal to four, K is a constant and is a natural number that is greater than or equal to two. The plurality of undercuts includes at least one set of undercuts arranged at an undercut interval that differs from a reference angle $\theta z$, and the reference angle $\theta z$ is specified by a relational expression of $\theta z=(360 \text{ degrees}/Pz)\pm(360 \text{ degrees}/2N)$.

A second aspect of the present invention is a brushed motor including a rotation shaft. A commutator is fixed to the rotation shaft. The commutator includes a plurality of segments insulated and separated by a plurality of undercuts. The plurality of undercuts are arranged at unequal angular intervals about a center axis of the rotation shaft. An armature is fixed to the rotation shaft. A plurality of permanent magnets are located at an outer side of the armature. The plurality of permanent magnets are arranged at equal intervals so that directions of magnetic poles differ in adjacent ones of the permanent magnets. A voltage equalizing line connects different ones of the segments. A positive electrode brush and a negative electrode brush are arranged on an outer circumference of the commutator at positions that are not facing each other. When Pz is the number of permanent magnets and N is the number of segments, a relationship of $N=Pz \times K$ is satisfied, where Pz is an even number that is greater than or equal to four, and K is a constant and is a natural number that is greater than or equal to two. The plurality of undercuts includes at least one set of undercuts arranged at an undercut interval that differs from a reference angle $\theta z$, and the reference angle $\theta z$ is specified by a relational expression of $\theta z=360 \text{ degrees}/Pz$.

A third aspect of the present invention is a brushed motor including a rotation shaft. A commutator is fixed to the rotation shaft. The commutator includes a plurality of segments insulated and separated by a plurality of undercuts. The plurality of undercuts are arranged at unequal angular intervals about a center axis of the rotation shaft. An armature is fixed to the rotation shaft. A plurality of permanent magnets are arranged at a radially outer side of the armature. A brush is arranged on an outer circumference of the commutator. The rotation shaft, the commutator, and the armature are integrally rotatable in forward and reverse directions. N is the number of the segments and the number of the plurality of undercuts. Circumferential center positions of the plurality of undercuts are shifted in a forward rotation direction and a reverse rotation direction from a corresponding circumferential center position when the plurality of undercuts are formed at an equal angle. Z1 is the total of the deviation angle of each of the undercuts shifted in the forward rotation direction. Z2 is the total of the deviation angle of each of the undercuts shifted in the reverse rotation direction. Z is the sum of the deviation angles. $Z=Z1+Z2$ is satisfied. When P is the number of pole pairs of the magnetic poles of the permanent magnets, $Q=(Z/N)/P$ represents an index value Q, and the index value Q is $-0.5 \text{ degrees}<Q<+0.5 \text{ degrees}$.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of a brushed motor will now be described with reference to FIGS. 1 to 6.

Figure 1:
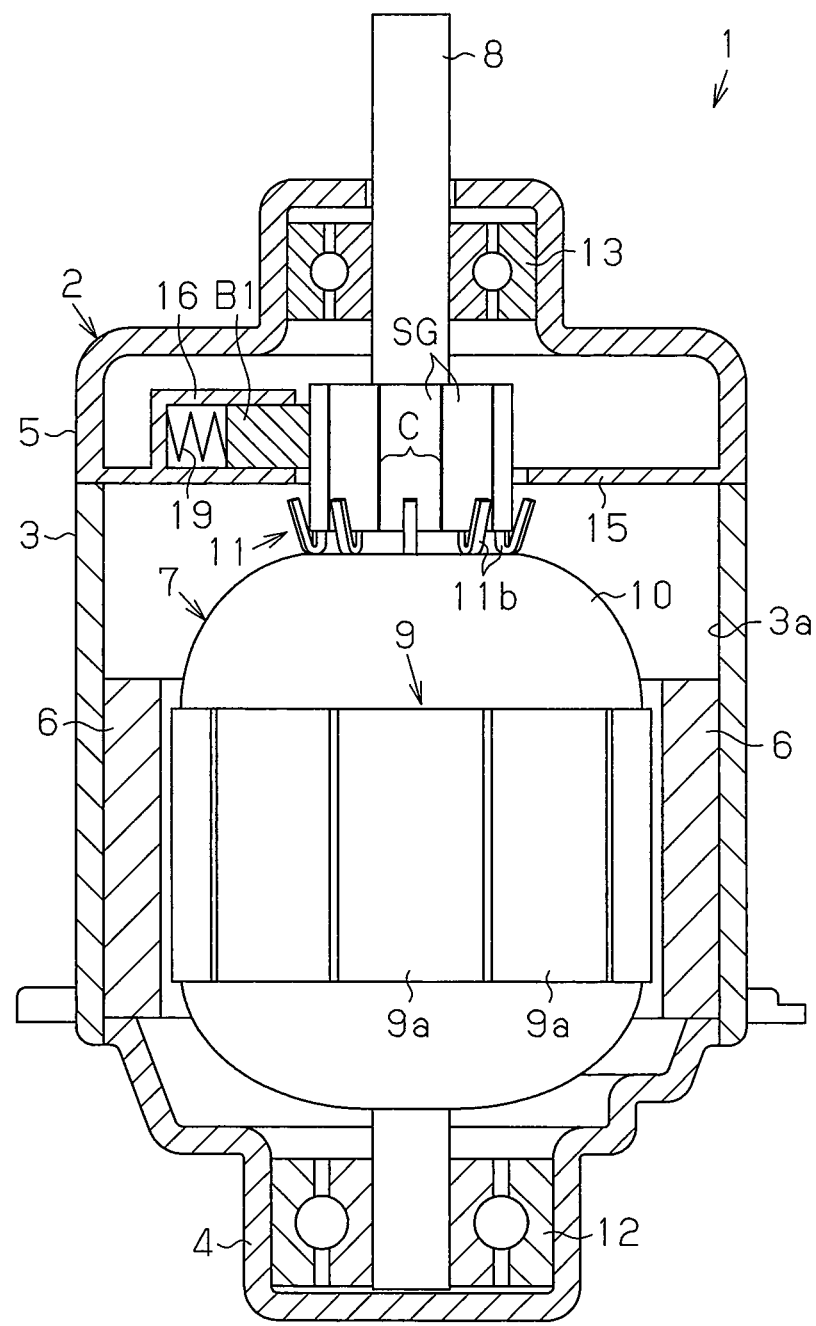
FIG. 1 is a cross-sectional view of a brushed motor having four poles and ten segments according to a first embodiment of the present invention.

As shown in FIG. 1, a brushed motor 1 includes a motor housing 2. The motor housing 2 includes a cylindrical yoke housing 3, an end cover 4 for closing a rear opening of the yoke housing 3, and a front cover 5 formed from an insulating material for covering a front opening of the yoke housing 3.

A plurality of (four in the present embodiment) permanent magnets 6 are arranged and fixed in a circumferential direction on an inner circumferential surface 3a of the yoke housing 3. The four permanent magnets 6 include two permanent magnets 6, in which a radially inner side is magnetized to an N pole and a radially outer side is magnetized to an S pole, and two permanent magnets 6, in which the radially inner side is magnetized to the S pole and the radially outer side is magnetized to the N pole. The permanent magnets are alternately arranged in the circumferential direction. In other words, the permanent magnets 6, of which the direction of the magnetic poles differs in the radial direction, are alternately arranged at equal intervals on the inner circumferential surface 3a of the yoke housing 3. Thus, the brushed motor 1 of the present embodiment is a motor in which the number of poles Pz is four (number of pole pairs P is two).

An armature 7 is arranged in the motor housing 2. The armature 7 includes a rotation shaft 8 arranged on a center Axis line Of the yoke housing 3, an armature core 9 fixed to the rotation shaft 8, a winding 10 wound around the armature core 9, and a commutator 11 fixed to the rotation shaft 8 so as to be adjacent to the armature core 9.

The rotation shaft 8 is supported rotatably relative to the motor housing 2 by bearings 12 and 13 arranged at a central position of the end cover 4 and a central position of the front cover 5, respectively. A distal end of the rotation shaft 8 projects from the front cover 5 so that the rotation shaft 8 serves as an output shaft that applies a rotation force to a driving mechanism (not shown).

The armature core 9 is fixed to the rotation shaft 8 and includes a plurality of (ten in the present embodiment) teeth 9a radially extending toward the radially outer side about a center axis O of the rotation shaft 8. The ten teeth 9a are formed at a predetermined equal pitch in the circumferential direction. A radial distal end face of each tooth 9a faces the permanent magnet 6 arranged on the inner circumferential surface 3a of the yoke housing 3. Since the number of teeth 9a is ten, the number of slots formed between the teeth 9a becomes ten. The winding 10 is wound around each tooth 9a.

Figure 2:
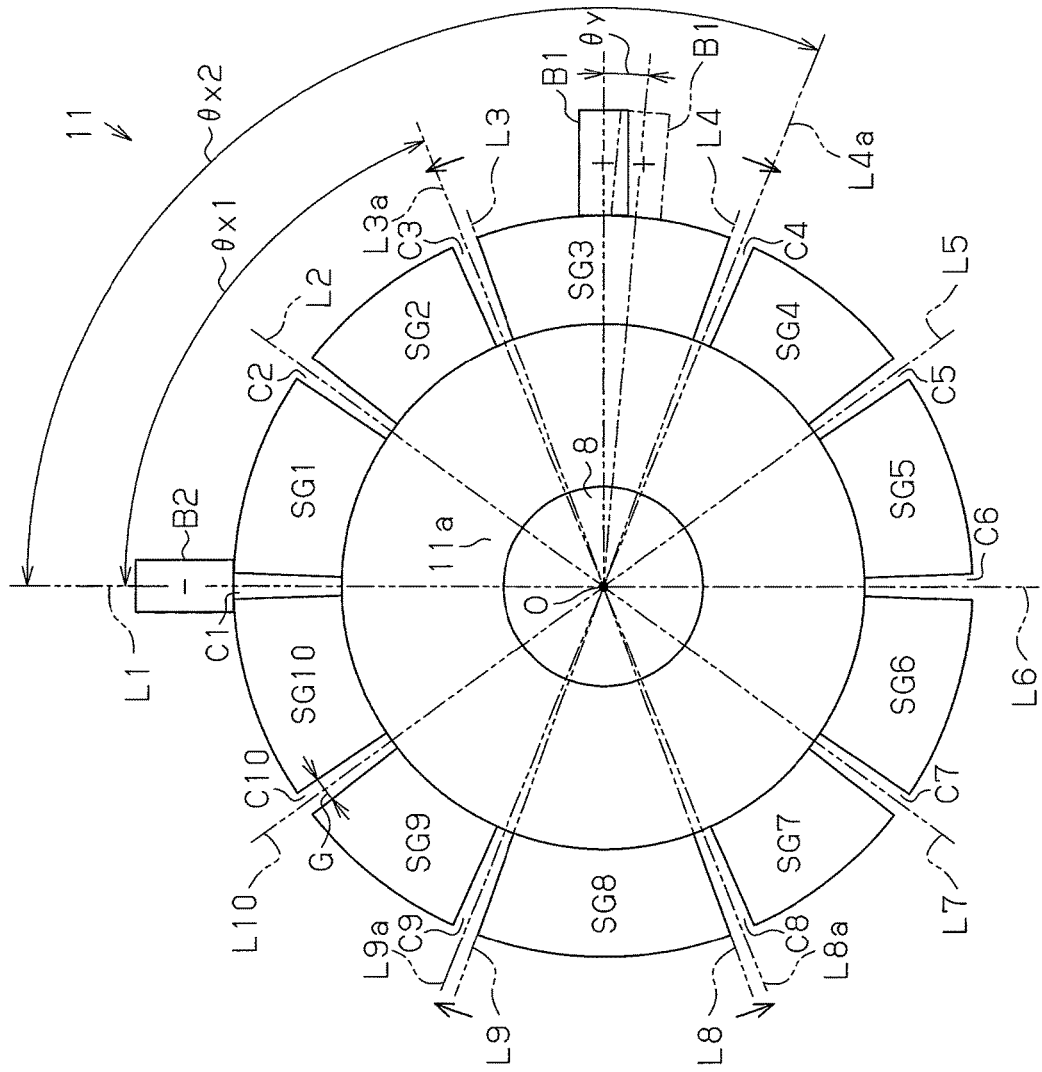
FIG. 2 is a front view taken in the axial direction of each segment of the motor of FIG. 1.

As shown in FIGS. 1 and 2, the commutator 11 is adjacent to the armature core 9 and is fixed to the rotation shaft 8 positioned in the front cover 5 to integrally rotate with the rotation shaft 8 together with the armature core 9. A plurality of segments SG are formed on the outer circumferential surface of the commutator 11. The number N of segments of the segments SG of the present embodiment is ten to correspond to the number of teeth 9a (number of slots). Therefore, the brushed motor 1 of the present embodiment is a brushed motor including four poles and ten segments. The ten segments SG are referred to as first to tenth segments SG1 to SG10 in order in the clockwise direction as viewed in FIG. 2 to facilitate description.

The clockwise direction in FIG. 2 is referred to as a forward rotation direction of the motor 1. Therefore, a counterclockwise direction is referred to as a reverse rotation direction of the motor 1.

As shown in FIG. 1, a riser 11b, which is bent toward the radially outer side, is integrally formed at an end close to the armature core 9 of each segment SG (SG1 to SG10) in an axial direction. The winding 10 wound around the tooth 9a is retained the riser 11b of each segment SG The retained portion of the winding 10 is fused and fixed to a riser 11b so as to be electrically connected with the segment SG including the riser 11b.

Figure 3:
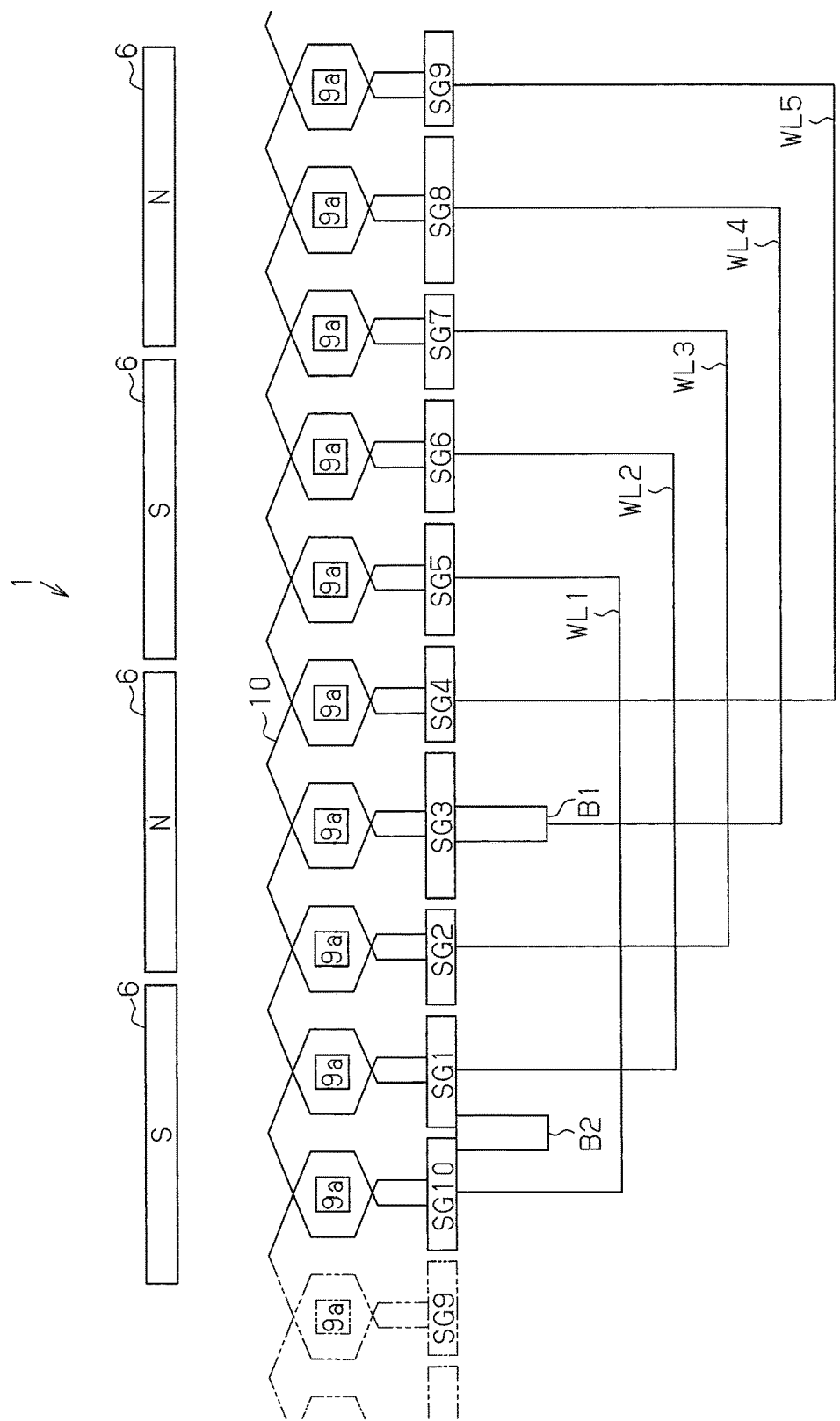
FIG. 3 is a spread out diagram showing a winding method for the motor of FIG. 1.

FIG. 3 is a spread out diagram showing the wire connection of the winding 10 between segment SG1 to SG10 and the ten teeth 9a. The winding 10 is wound around both of adjacent teeth 9a and is wound by performing lap winding in which an initiating end is electrically connected to one segment SG and a terminating end is electrically connected to the other segment SG.

As shown in FIG. 3, five voltage equalizing lines, namely, first to fifth voltage equalizing lines WL1 to WL5, connect a pair of segments SG to reduce the number of brushes to two, namely, the positive and negative electrode brushes B1 and B2. More specifically, the first voltage equalizing line WL1 connects the tenth segment SG10 and the fifth segment SG5. The second voltage equalizing line WL2 connects the first segment SG1 and the sixth segment SG6. Furthermore, the third voltage equalizing line WL3 connects the second segment SG2 and the seventh segment SG7. The fourth voltage equalizing line WL4 connects the third segment SG3 and the eighth segment SG8. The fifth voltage equalizing line WL5 connects the fourth segment SG4 and the ninth segment SG9.

As shown in FIG. 2, the two brushes, namely, the positive electrode and negative electrode brushes B1 and B2, are pushed against the first to tenth segments SG1 to SG10 so as to be able to slide in contact from the radially outer side. The positive electrode and negative electrode brushes B1 and B2 are arranged at positions spaced apart by a pitch (brush arrangement angle θb) of 90 degrees in the circumferential direction so as not to face each other.

In detail, as shown in FIG. 1, a base plate 15 is extended and formed to surround the commutator 11 on an inner side surface of the front cover 5. On the base plate 15, two (only one is shown in FIG. 1) brush boxes 16 respectively accommodating the positive electrode and negative electrode brushes B1 and B2 extend toward the center axis O of the rotation shaft 8.

The two brush boxes 16 are formed such that a circumferential center position is spaced apart by 90 degrees from each other in the circumferential direction about the center axis O of the rotation shaft 8. In the two brush boxes 16, the radially inner side is open and the shape of the opening as viewed from the rotation shaft 8 is square. The positive electrode brush B1 is inserted into one brush box 16. The negative electrode brush B2 is inserted into the other brush box 16.

Therefore, as shown in FIG. 2, the positive electrode brush B1 and the negative electrode brush B2 are separated from each other by 90 degrees in the circumferential direction about the center axis O of the rotation shaft 8 since the two brush boxes 16 are formed separated from each other by 90 degrees in the circumferential direction about the center axis O. That is, the circumferential center positions of the slide-contact surfaces of the positive electrode and negative electrode brushes B1 and B2 are separated from each other by 90 degrees in the circumferential direction about the center axis O of the rotation shaft 8. In other words, the brush arrangement angle θb (=360/(Pz×K)) is 90 degrees. Pz is the number of poles, and K is a natural number and is one in this case.

The two brush boxes 16 accommodates compression coils spring 19 that elastically biases the corresponding positive electrode and negative electrode brushes B1 and B2 toward the radially inner side.

As a result, the positive electrode and negative electrode brushes B1 and B2 can each move toward the radially inner side while being guided along the brush box 16. The positive electrode and negative electrode brushes B1 and B2 are projected from the opening on the radially inner side of the respective brush boxes 16, and are pushed against each segment SG of the commutator 11 in slide-contact.

Therefore, the current is supplied from the positive electrode brush B1 and the negative electrode brush B2 to the winding 10 wound around the armature core 9 by the segments SG slide-contact the positive electrode brush B1 and the negative electrode brush B2 so that the brushed motor 1 rotates in forward and reverse directions.

As shown in FIG. 2, the first to tenth segments SG1 to SG10 are fixed to an outer circumferential surface of a cylindrical insulating member 11a fixed to the rotation shaft 8, and the adjacent segments SG are insulated by an undercut (groove) C. The ten undercuts C have the same interval in the circumferential direction (undercut width G). The ten undercuts C are referred to as first to tenth undercuts C1 to C10 in order in the forward rotation direction to facilitate description of each undercut.

The first to tenth segments SG1 to SG10 are formed by cutting a cylindrical conductive metal base material (not shown) in an axial direction. In detail, the cylindrical conductive metal base material is externally fitted and fixed to the outer circumferential surface of the insulating member 11a fixed to the rotation shaft 8. The cylindrical conductive metal base material fixed to the outer circumferential surface of the insulating member 11a is then cut along the axial direction from ten regions defined in advance in the circumferential direction. This forms the first to tenth segments SG1 to GS10 insulated and separated from each other. The portions cut in the axial direction become the first to tenth undercuts C1 to C10.

The first to tenth undercuts C1 to c10 are not located at equal angular intervals (equal pitch) in the circumferential direction about the center axis O of the rotation shaft 8. That is, the first to tenth undercuts C1 to C10 are located at predetermined unequal angular intervals (unequal pitch) in the circumferential direction.

Formation Position of Undercut C

The formation positions of the first to tenth undercuts C1 to C10 of when forming the ten segments SG (SG1 to SG10) of the commutator 11 will now be described.

Figure 4:
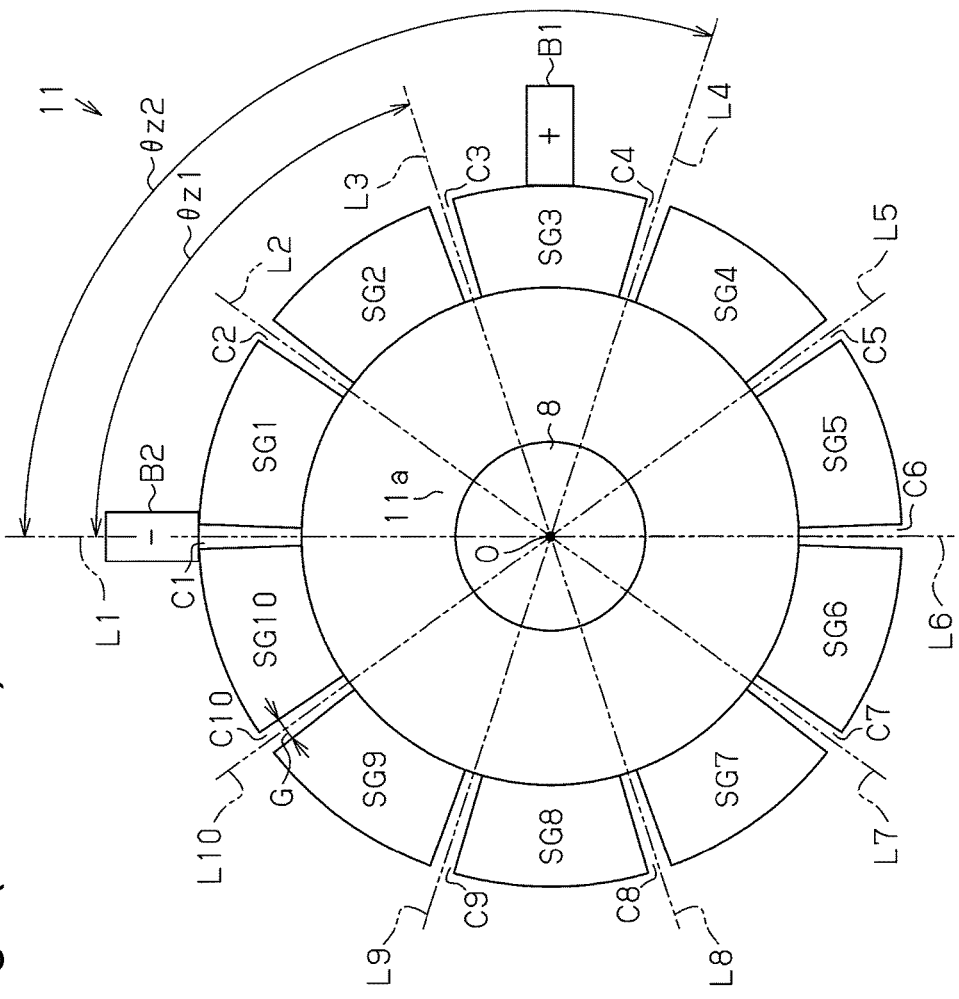
FIG. 4 is a front view taken in the axial direction of each segment of a brushed motor having four poles and ten segments at an equal pitch.

First, FIG. 4 shows the formation positions of the first to tenth undercuts C1 to C10 of the conventional motor of four pole ten segments. The first to tenth undercuts C1 to C10 are formed at an equal pitch (=36 degrees) in the circumferential direction about the center axis O of the rotation shaft 8. In this case, lines extending through the circumferential center positions of each of the undercuts C1 to C10 from the center axis O of the rotation shaft 8 are referred to as first to tenth reference lines L1 to L10 in order in the forward rotation direction.

Figure 5:
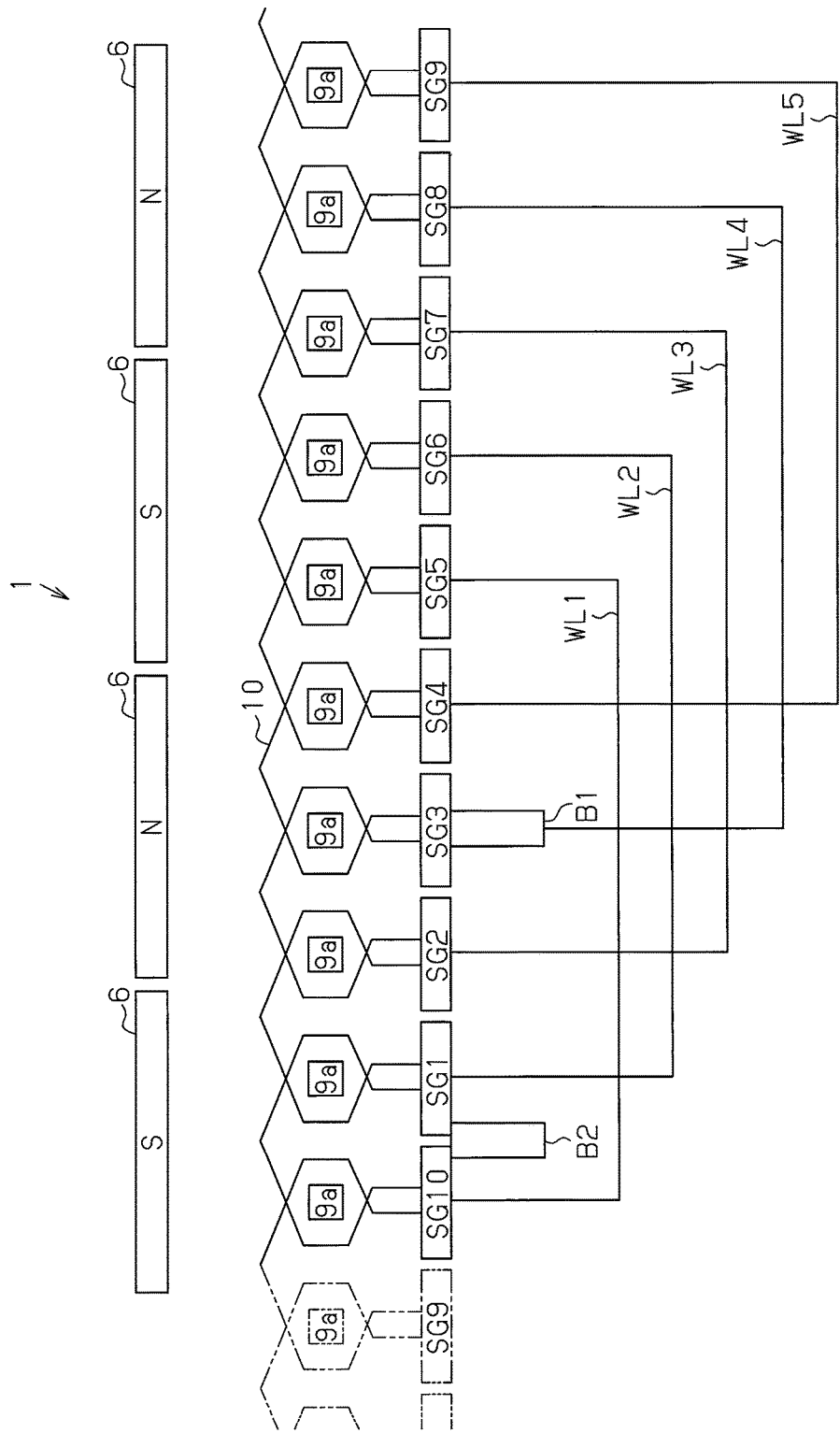
FIG. 5 is a spread out diagram showing a winding method for the motor of FIG. 4.

FIG. 5 is a spread out diagram showing a wire connection of the winding 10 of the conventional brushed motor having four poles and ten segments shown in FIG. 4. The winding 10 is wound as a lap winding in the same manner as the present embodiment.

The brushed motor 1 of the present embodiment is a motor in which the number of poles Pz is four and the number of segments N is ten, like the conventional brushed motor having four poles and ten segments shown in FIG. 4, and in which the following relational expression is satisfied.

$$N = Pz(K - 0.5)$$

Here, the number of poles Pz is an even number that is greater than or equal to four. K is a constant and is a natural number that is greater than or equal to two.

The brushed motor in which such relational expression is satisfied is a motor in which the number of slots (number of teeth) is not dividable by the number of poles Pz. The brushed motor 1 of the present embodiment is the motor in which the above relational expression is satisfied when the constant K is three.

In the case of the brushed motor in which N=Pz(K−0.5) is satisfied and the positions of each of the undercuts are formed at an equal pitch, one undercut C is set as a reference and the circumferential center positions of the other undercuts C exist at positions of a reference angle θz defined below.

$$\theta z = (360 \text{ degrees}/Pz) \pm (360 \text{ degrees}/2N)$$

When the number of poles Pz is four and the number of segments N is ten, the reference angle becomes θz=(360 degrees/4)±(360 degrees/20)=90 degrees±18 degrees. Further, two reference angles θz, namely, 108 degrees and 72 degrees, are obtained. The two reference angles θz mean that when viewed from one undercut, the other undercuts exist at the position of 108 degrees and the position of 72 degrees, respectively.

Among the two reference angles θz, one of the reference angles θz, namely, 72 degrees, is referred to as a first reference undercut interval θz1. The other one of the reference angles θz, namely, 108 degrees, is referred to as a second reference undercut interval θz2.

That is, in the case of the motor of four poles and ten segments shown in FIG. 4, if, for example, the first undercut C1 is used as a reference, the third undercut C3 exists at the position separated by the first reference undercut interval θz1 from the first undercut C1, and the fourth undercut C4 exists at the position separated by the second reference undercut interval θz2 from the first undercut C1.

The positions of the first to tenth undercuts C1 to C10 of the present embodiment are located at an unequal pitch, as shown in FIG. 2.

That is, in the present embodiment, at least one set of undercut intervals θx1 and θx2 is set that differs from the first and second reference undercut intervals θz1 and θz2 specified by the reference angle θz (=(360 degrees/Pz)±(360 degrees/2N)).

In FIG. 2, the undercut interval θx1 is set as 70 degrees with respect to the first reference undercut interval θz1 (=72 degrees) having the first undercut C1 as the reference, and the undercut interval θx2 is set as 110 degrees with respect to the second reference undercut interval θz2 (=108 degrees).

As a result, the third undercut C3 shown in FIG. 2 is formed such that a third reference line L3a is located at a position shifted by two degrees in the counterclockwise direction from the third reference line L3 of the third undercut C3 shown in FIG. 4. Furthermore, the fourth undercut C4 shown in FIG. 2 is formed such that a fourth reference line L4a is located at a position shifted by two degrees in the clockwise direction from the fourth reference line L4 of the fourth undercut C4 shown in FIG. 4.

Thus, the pitch between the third undercut C3 and the fourth undercut C4 shown in FIG. 2 becomes an unequal pitch of 40 degrees that differs from 36 degrees (equal pitch). Due to the formation of the unequal pitch of 40 degrees, to compensate for the 4 degrees with each of the other pitches, the pitch between the second undercut C2 and the third undercut C3 and the pitch between the fourth undercut C4 and the fifth undercut C5 are an unequal pitch of 34 degrees.

Therefore, the circumferential widths of the second and fourth segments SG2 and SG4 arranged at the positions corresponding to the unequal pitch of 34 degrees are formed to be short with respect to the circumferential width of the segment SG arranged at the position corresponding to the equal pitch of 36 degrees. In contrast, the circumferential width of the third segment SG3 arranged at the position corresponding to the unequal pitch of 40 degrees is formed to be long with respect to the circumferential width of the segment SG arranged at the position corresponding to the equal pitch of 36 degrees.

Moreover, in the present embodiment, the eighth undercut C8 shown in FIG. 2 is also formed such that an eighth reference line L8a is located at a position shifted by two degrees in the counterclockwise direction from the eighth reference line L8 of the eighth undercut C8 shown in FIG. 4. Furthermore, the ninth undercut C9 shown in FIG. 2 is formed such that an ninth reference line L9a is located at a position shifted by two degrees in the clockwise direction from the ninth reference line L9 of the ninth undercut C9 shown in FIG. 4.

Thus, the pitch between the eighth undercut C8 and the ninth undercut C9 shown in FIG. 2 becomes an unequal pitch of 40 degrees, which differs from 36 degrees (equal pitch). In the same manner, due to the formation of the unequal pitch of 40 degrees, to compensate for the 4 degrees with each of the other pitches, the pitch between the seventh undercut C7 and the eighth undercut C8 and the pitch between the ninth undercut C9 and the tenth undercut C10 are formed at an unequal pitch of 34 degrees.

Therefore, the circumferential widths of the seventh and ninth segments SG7 and SG9 located at the positions corresponding to the unequal pitch of 34 degrees are formed to be short with respect to the circumferential width of the segment SG arranged at the position corresponding to the equal pitch of 36 degrees. In contrast, the circumferential width of the eighth segment SG8 arranged at the position corresponding to the unequal pitch of 40 degrees is formed to be long with respect to the circumferential width of the segment SG arranged at the position corresponding to the equal pitch of 36 degrees.

In the present embodiment, the first to fifth undercuts C1 to C5 include one set of undercuts including three undercuts, two being arranged at an unequal pitch of 34 degrees and one being arranged at an unequal pitch of 40 degrees. The segments SG having different circumferential widths are formed in correspondence with the two unequal pitches of 34 degrees and one unequal pitch of 40 degrees on the right half of the first to fifth undercuts C1 to C5. Furthermore, the sixth to tenth undercuts C6 to C10 also include one set of undercuts including three undercuts, two being arranged at the unequal pitch of 34 degrees and one being arranged at the unequal pitch of 40 degrees. The segments SG having different circumferential widths are also respectively formed in correspondence with the two unequal pitches of 34 degrees and one unequal pitch of 40 degrees on the left half of the sixth to tenth undercuts C6 to C10.

In the present embodiment, to compensate for the circumferential width of 4 degrees generated when the unequal pitch of 40 degrees is formed with each of the other pitches, two unequal pitches of 34 degrees are used. Instead, for example, the circumferential width for 4 degrees may be compensated for with one unequal pitch of 32 degrees. In this case as well, one segment SG corresponding to one unequal pitch of 32 degrees and one segment SG corresponding to one unequal pitch of 40 degrees may be formed on the right half of the first to fifth undercuts C1 to C5.

In the present embodiment, the undercut intervals θx1 and θx2 that differ from the first and second reference undercut intervals θz1 and θz2 (reference angle θz) are 70 degrees and 110 degrees, respectively. In other words, the third undercut C3 is formed at the location of the third reference line L3a shifted by two degrees in the counterclockwise direction from the third reference line L3, and the fourth undercut C4 is formed at the location of the fourth reference line L4a shifted by two degrees in the clockwise direction from the fourth reference line L4.

However, the different undercut intervals $\theta x1$ and $\theta x2$ are not limited to 70 degrees and 110 degrees. That is, in the above case, each of the angle shifted in the counterclockwise direction from the third reference line L3 and the angle shifted in the clockwise direction from the fourth reference line L4 are not limited to two degrees.

However, the circumferential width of the second segment SG2 (same for the fourth segment SG4) is limited so as not to be smaller than the value specified in advance when the deviation angle is too large and the third reference line L3a approaches the second reference line L2.

This means that the positive electrode brush B1 and the negative electrode brush B2 do not simultaneously contact the three segments (same for the fourth segment SG4), namely, the second segment SG2 and the first and third segments SG1 and SG3 adjacent to the second segment SG2. The deviation angle is limited within a predetermined range to set the circumferential width of the second segment SG2 (same for the fourth segment SG4) so that the positive electrode brush B1 and the negative electrode brush B2 do not simultaneously contact the three segments.

The operation of the brushed motor 1 will now be described.

In the brushed motor 1, the bush arrangement angle $\theta b$ formed by the positive electrode brush B1 and the negative electrode brush B2 is 90 degrees, and thus the positive electrode and negative electrode brushes B1 and B2 do not simultaneously traverse the adjacent segment SG That is, the contact timing at which the positive electrode brush B1 traverses and contacts the adjacent segment SG and the separating timing at which the positive electrode brush B1 separates therefrom differ from the contact timing at which the negative electrode brush B2 traverses and contacts the adjacent segment SG and the separating timing at which the negative electrode brush B2 separates therefrom.

Therefore, the fluctuation width of the current value supplied to the winding 10 can be reduced compared to when the positive electrode brush B1 and the negative electrode brush B2 simultaneously traverse the adjacent segments SG Thus, the excitation force of the brushed motor 1 can be dispersed, and the vibration and the abnormal noise can be reduced.

Furthermore, in the first to twelfth segments SG1 to SG12, two sets of undercut intervals $\theta x1$ and $\theta x2$ are set that differ from the reference angle $\theta z$, that is, the first and second reference undercut intervals $\theta z1$ and $\theta z2$ defined for the brushed motor 1 having four poles and ten segments are set.

That is, among the first to twelfth segments SG1 to SG12, the circumferential widths of the second, fourth, seventh, and ninth segments SG2, SG4, SG7, and SG9 arranged at the positions corresponding to the unequal pitch of 32 degrees are shorter than the circumferential width of the segment SG arranged at the position corresponding to the equal pitch of 36 degrees. Furthermore, the circumferential widths of the third and eighth segments SG3 and SG8 arranged at the positions corresponding to the unequal pitch of 40 degrees are longer than the circumferential width of the segment SG arranged at the position corresponding to the equal pitch of 36 degrees.

Therefore, the abnormal noise generated by the force received by each segment SG1 to SG10 from the positive electrode and negative electrode brushes B1 and B2 during rotation is not maximized but averaged so that the abnormal noise level can be lowered.

Figure 6A:
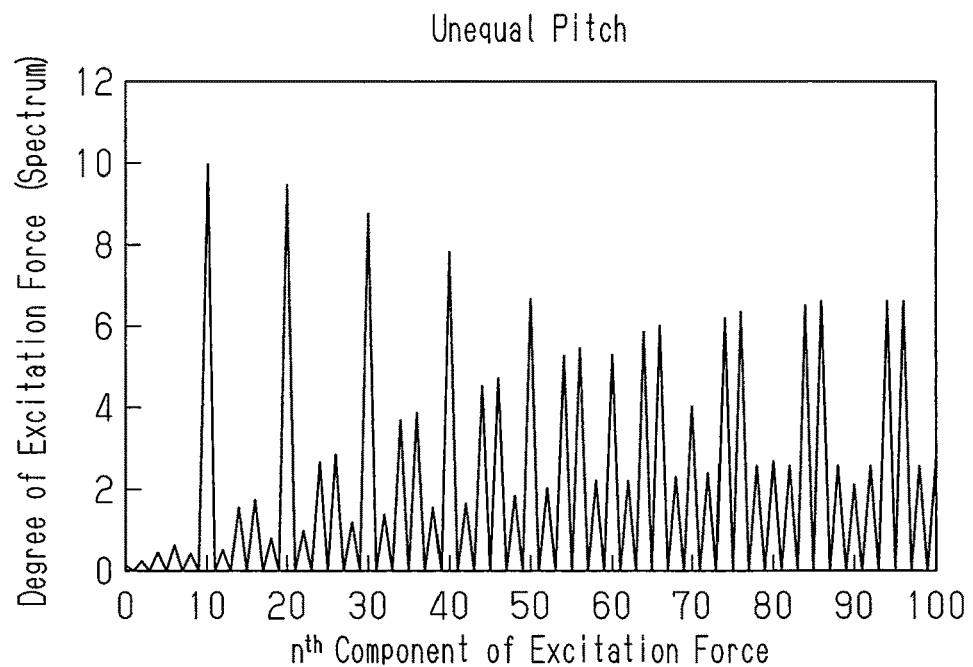
FIG. 6A is a graph showing an excitation force with respect to each $n^{th}$ order frequency component of the excitation force of the motor of FIG. 1.
Figure 6B:
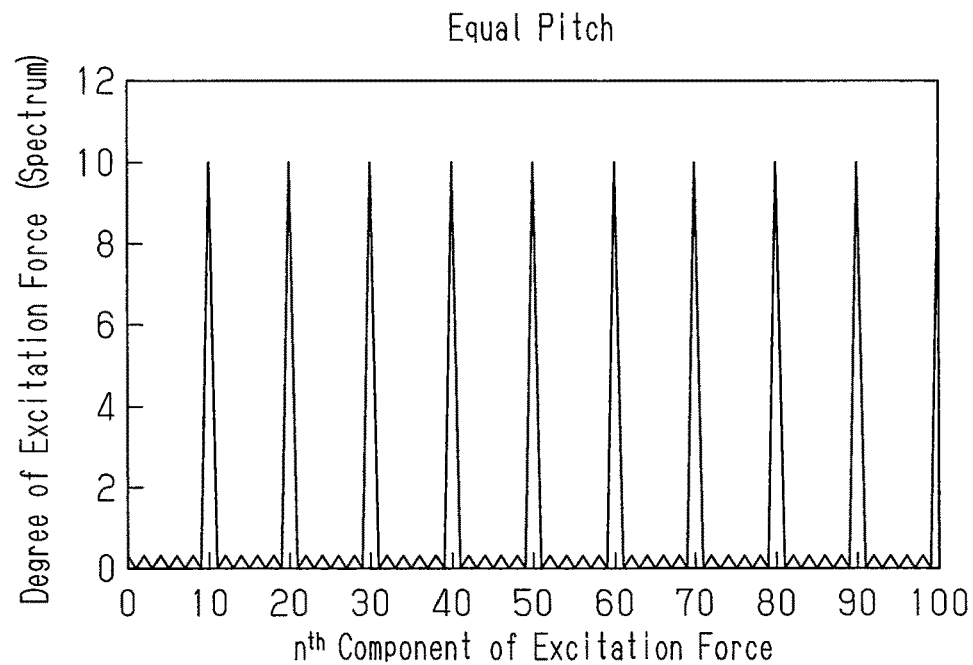
FIG. 6B is a graph showing an excitation force with respect to each $n^{th}$ order frequency component of the motor of FIG. 4.

FIG. 6A is a graph in which the magnitude of the excitation force with respect to the $n^{th}$ order component of each excitation force in the brushed motor 1 having four poles and ten segments including the undercuts having an unequal pitch shown in FIG. 2 when rotated at a rotation speed of 6500 rpm or less was obtained through experiments. FIG. 6B is a graph in which the magnitude of the excitation force with respect to the $n^{th}$ order component of each excitation force in the brushed motor 1 having four poles and ten segments including the undercuts all having an equal pitch shown in FIG. 4 when rotated at a rotation speed of 6500 rpm or less was obtained through experiments.

As apparent from FIGS. 6A and 6B, in the case of the brushed motor 1 having four poles and ten segments including the undercuts having an unequal pitch, the excitation force can be greatly reduced compared to the brushed motor having four poles and ten segments including the undercuts all having an equal pitch.

The first embodiment has the following advantages.

(1) In the embodiment described above, the brush arrangement angle $\theta b$ formed by the positive electrode brush B1 and the negative electrode brush B2 is 90 degrees in the brushed motor 1 having four poles and ten segments. Thus, the fluctuation width of the current value supplied to the winding 10 is small compared to when the positive electrode and negative electrode brushes B1 and B2 simultaneously traverse the adjacent segment SG As a result, the brushed motor 1 disperses the excitation force and reduces vibration and abnormal noise.

(2) In the embodiment described above, the first to tenth undercuts C1 to C10 include two sets of undercut intervals $\theta x1$ and $\theta x2$, which differ from the reference angle $\theta z$, that is, the first and second reference undercut intervals $\theta z1$ and $\theta z2$, defined for the brushed motor 1 having four poles and ten segments.

Therefore, the abnormal noise generated by the force received by each segment SG1 to SG10 from the positive electrode and negative electrode brushes B1 and B2 during rotation is not maximized but averaged, and the abnormal noise level is lowered.

(3) In the present embodiment, the voltage equalizing lines WL1 to WL5 connected between different segments SG are used so that each number of positive electrode brushes B1 and negative electrode brushes B2 is one. This lowers the occurrence rate of contact failure caused by brush vibration, and the desired unequal pitch contact is obtained in an ensured manner.

The first embodiment may be modified as described below.

In the first embodiment, the brush arrangement angle $\theta b$ formed by the positive electrode brush B1 and the negative electrode brush B2 is 90 degrees. As shown in FIG. 2, the positive electrode brush B1 shown by the solid line may be arranged in a shifted manner as shown by the double-dashed line. In this case, the deviation angle $\theta y$ is preferably changed within a range of $\theta y < (360 \text{ degrees}/2 Pz)$. In other words, the positive electrode brush B1 and the negative electrode brush B2 may be arranged at the positions specified by $\theta b + \theta y$.

The reference angle $\theta z$ is expressed with the following relational expression when the deviation angle is shifted only by $\theta y$.

$$\theta z = (360 \text{ degrees}/Pz) \pm (360 \text{ degrees}/2N) \pm \theta y$$

In this case, at least one set of undercuts is used located at an undercut interval differing from the reference undercut interval obtained from the above relational expression. In this case as well, the fluctuation width of the current value supplied to the winding 10 can also be reduced. As a result, the brushed motor 1 can disperse the excitation force and can reduce the vibration and the abnormal noise.

In the first embodiment described above, the present invention is embodied in the brushed motor 1 having four poles and ten segments. However, the present invention may be applied to a brushed motor, other than the brushed motor 1 having four poles and ten segments, in which $N=Pz(K-0.5)$ is satisfied. K is a natural number of two or greater than or equal to four.

Second Embodiment

A second embodiment will now be described with reference to FIGS. 7 to 10.

The brushed motor 1 described in the first embodiment above is a motor in which a relational expression $N=Pz(K-0.5)$ is satisfied, where Pz is the number of poles and N is the number of segments.

The brushed motor 1 of the second embodiment is a motor in which the following relational expression is satisfied, where Pz is the number of poles and N is the number of segments.

$$N = Pz \times K$$

Here, the number of poles Pz is an even number that is greater than or equal to four. K is a constant and is a natural number that is greater than or equal to two.

The brushed motor in which such relational expression is satisfied is a motor in which the number of slots (number of teeth) is dividable by the number of poles Pz. This differs from the first embodiment.

In the second embodiment, the brushed motor 1 of a so-called four poles and twelve segments in which the number of poles Pz is four, the constant K is three, and the number of segments N is twelve will be described for the sake of brevity. The characteristics of the second embodiment are in that the number N of segments SG is 12 (number of teeth 9a is 12) and the positions of the 12 undercuts for the 12 segments SG are formed at a predetermined unequal angular interval (unequal pitch) in the circumferential direction.

Therefore, only the formation positions of the undercut will be described in detail for the sake of brevity.

Formation Position of Undercut C

The formation positions of the first to twelfth undercuts C1 to C12 that form the 12 segments SG (SG1 to SG12) of the commutator 11 will now be described.

Figure 9:
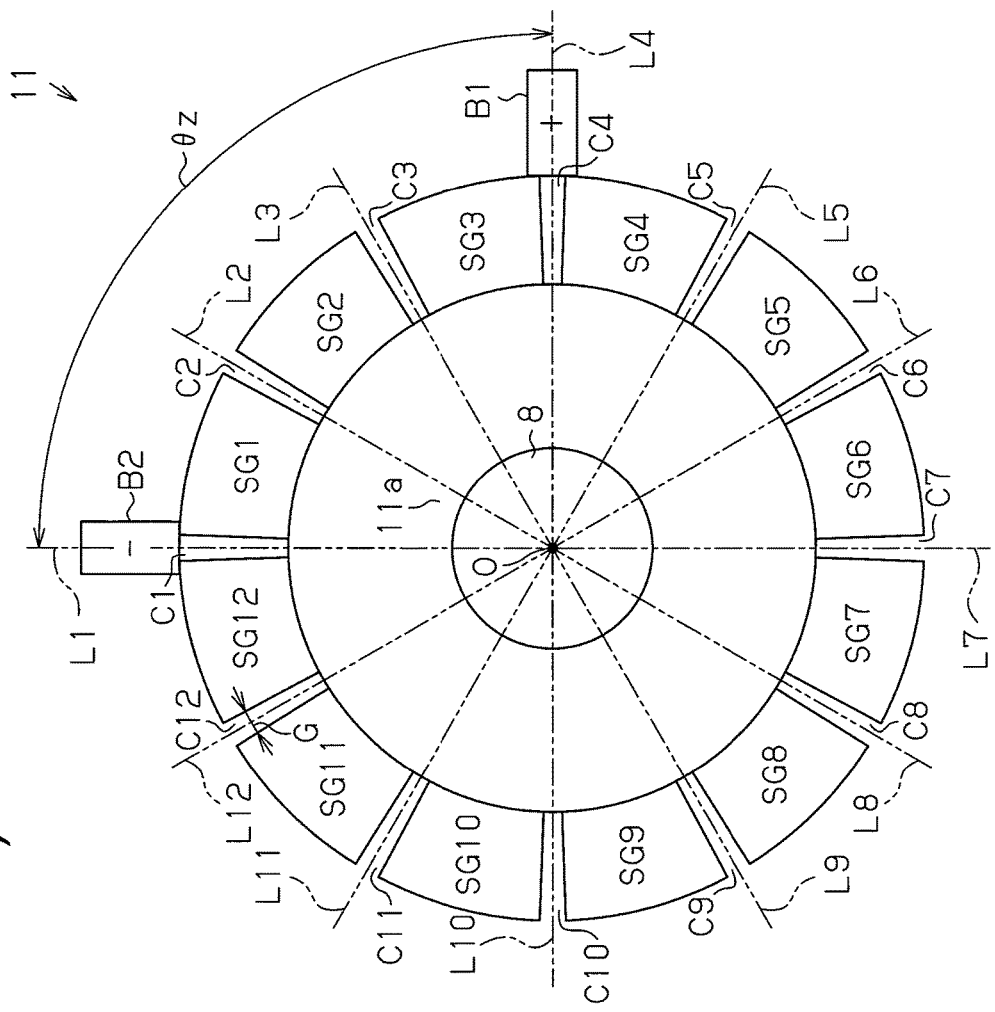
FIG. 9 is a front view taken in the axial direction of each segment of a brushed motor having four poles and twelve segments of an equal pitch.

First, FIG. 9 shows the formation position of the first to twelfth undercuts C1 to C12 of the conventional brushed motor of four poles and twelve segments. The first to twelfth undercuts C1 to C12 are formed at an equal pitch (=30 degrees) in the circumferential direction about the center axis O of the rotation shaft 8. In this case, lines extending through the circumferential center position of each undercut C1 to C12 from the center axis O of the rotation shaft 8 are referred to as first to twelfth reference lines L1 to L12 in order in the forward rotation direction.

Figure 10:
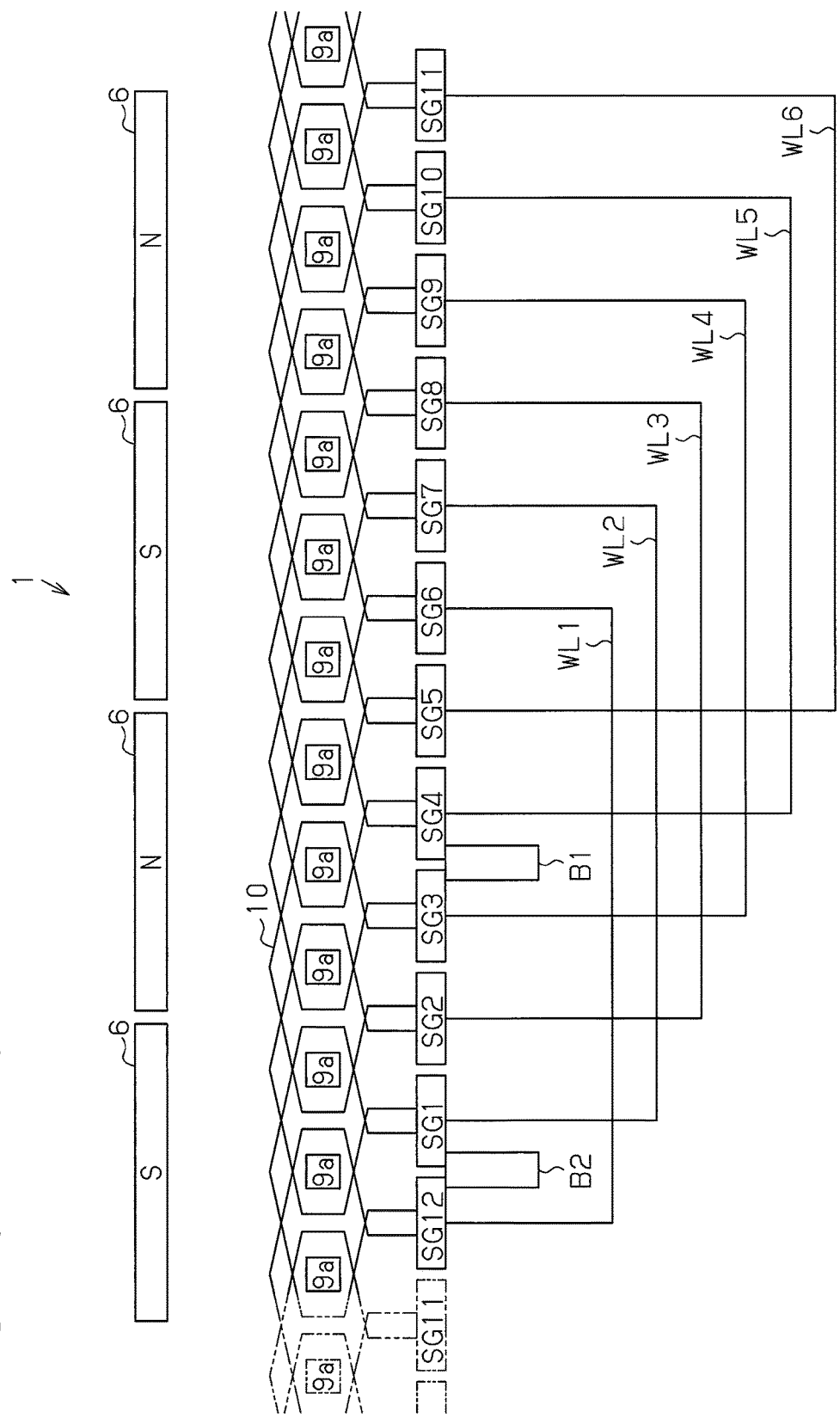
FIG. 10 is a spread out diagram showing a winding method of the motor of FIG. 9.

FIG. 10 is a spread out diagram showing a wire connection of the winding 10 of the conventional brushed motor of four poles and twelve segments shown in FIG. 9, in which the winding 10 is wound in a lap winding.

To reduce the number of brushes to two brushes, the positive electrode and negative electrode brushes B1 and B2, six voltage equalizing lines, the first to sixth voltage equalizing lines WL1 to WL6, are connected between the pair of segments SG In detail, the first voltage equalizing line WL1 is connected between the twelfth segment SG12 and the sixth segment SG6. The second voltage equalizing line WL2 is connected between the first segment SG1 and the seventh segment SG7. The third voltage equalizing line WL3 is connected between the second segment SG2 and the eighth segment SG8. The fourth voltage equalizing line WL4 is connected between the third segment SG3 and the ninth segment SG9. The fifth voltage equalizing line WL5 is connected between the fourth segment SG4 and the tenth segment SG10. The sixth voltage equalizing line WL6 is connected between the fifth segment SG5 and the eleventh segment SG11.

Figure 7:
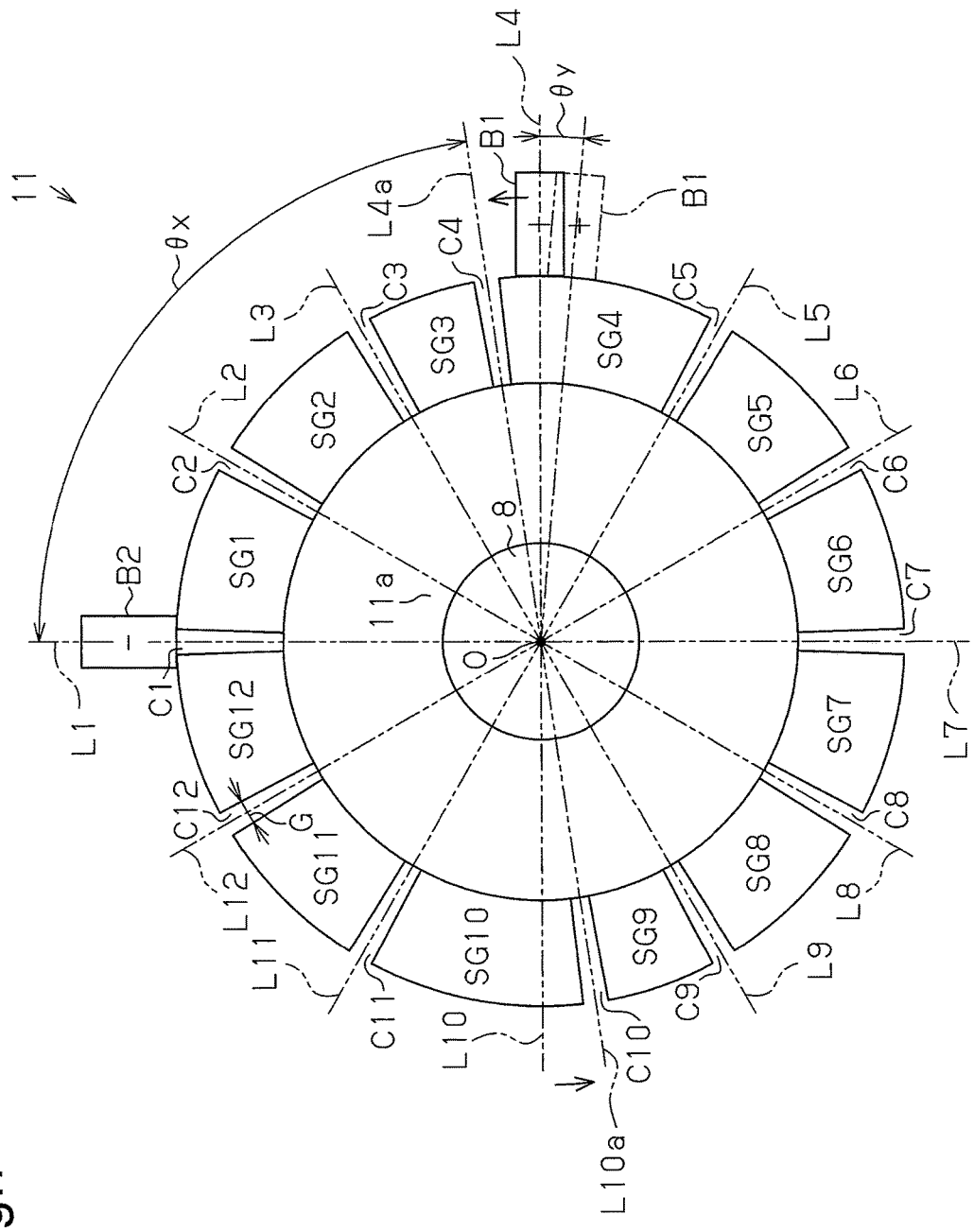
FIG. 7 is a front view taken in the axial direction of each segment of a brushed motor having four poles and twelve segments according to a second embodiment of the present invention.

The brushed motor 1 of the second embodiment shown in FIG. 7 is a motor belonging to a motor in which the number of poles Pz is four and the number of segments N is twelve, like the brushed motor having four poles and twelve segments at an equal pitch and shown in FIG. 9, and in which the following relational expression is satisfied.

$$N = Pz \times K$$

Here, when $N=Pz \times K$ is satisfied and the position of each undercut is formed at equal pitch, one undercut C is used as a reference and the circumferential center positions of the other undercuts C exist at positions of the reference angle $\theta z$ defined below.

$$\theta z = (360 \text{ degrees}/Pz)$$

When the number of poles Pz is four and the number of segments N is twelve, the reference angle $\theta z$ becomes 90 degrees. The reference angle $\theta z$ (=90 degrees) means that when seen from one undercut, the other undercuts exist at the positions of 90 degrees.

That is, in the brushed motor of four poles and twelve segments of an equal pitch shown in FIG. 9, for example, when the first undercut C1 is used as a reference, the fourth undercut C4 exists at a location separated by the reference angle $\theta z$ from the first undercut C1.

The first to twelfth undercuts C1 to C12 of the second embodiment are located at an unequal pitch, as shown in FIG. 7.

That is, in the second embodiment, at least one set of undercut intervals $\theta x$, which differ from the angle specified by the reference angle $\theta z$ (=360 degrees/Pz) is set.

In FIG. 7, the undercut interval $\theta x$, which differs from the reference angle $\theta z$ having the first undercut C1 as a reference, is 88 degrees.

As a result, the fourth undercut C4 shown in FIG. 7 is formed such that the fourth reference line L4a is located at a position shifted by two degrees in the counterclockwise direction from the fourth reference line L4 of the fourth undercut C4 shown in FIG. 9.

Thus, the pitch between the third undercut C3 and the fourth undercut C4 shown in FIG. 7 becomes an unequal pitch of 28 degrees, which differs from 30 degrees (equal pitch). Due to the formation of the unequal pitch of 28 degrees, to compensate for the two degrees with each of the other pitches, the pitch between the fourth undercut C4 and the fifth undercut C5 is formed at an unequal pitch of 32 degrees.

Therefore, the circumferential width of the third segment SG3 arranged at the position corresponding to the unequal pitch of 28 degrees is formed to be short with respect to the circumferential width of the segment SG arranged at the position corresponding to the equal pitch of 30 degrees. In contrast, the circumferential width of the fourth segment SG4 arranged at a position corresponding to the unequal pitch of 32 degrees is formed to be long with respect to the circumferential width of the segment SG arranged at the position corresponding to the equal pitch of 30 degrees.

In the present embodiment, the tenth undercut C10 shown in FIG. 7 is also formed such that the tenth reference line L10a is located at a position shifted by two degrees in the counterclockwise direction from the tenth reference line L10 of the tenth undercut C10 shown in FIG. 9.

Thus, the pitch between the ninth undercut C9 and the tenth undercut C10 shown in FIG. 7 becomes an unequal pitch of 28 degrees, which differs from 36 degrees (equal pitch). Due to the formation of the unequal pitch of 28 degrees, to compensate for the two degrees with each of the other pitches, the pitch between the tenth undercut C10 and the eleventh undercut C11 is formed as an unequal pitch of 32 degrees.

Therefore, the circumferential width of the ninth segment SG9 arranged at the position corresponding to the unequal pitch of 28 degrees is formed to be short with respect to the circumferential width of the segment SG arranged at the position corresponding to the equal pitch of 30 degrees. In contrast, the circumferential width of the tenth segment SG10 arranged at the position corresponding to the unequal pitch of 32 degrees is formed to be long with respect to the circumferential width of the segment SG arranged at the position corresponding to the equal pitch of 30 degrees.

Thus, in the present embodiment, the first to sixth undercuts C1 to C6 include a set of undercuts including two undercuts, one being arranged at the unequal pitch of 28 degrees and one being arranged at the unequal pitch of 32 degrees. The segments SG having different circumferential widths are formed in correspondence with the one unequal pitch of 28 degrees and the one unequal pitch of 32 degrees at the right half of the first to sixth undercuts C1 to C6. Furthermore, the seventh to twelfth undercuts C7 to C12 also include one set of undercuts including two undercuts, one arranged at the unequal pitch of 28 degrees and one arranged at the unequal pitch of 32 degrees. The segments SG having different circumferential widths are also formed in correspondence with the one unequal pitch of 28 degrees and the one unequal pitch of 32 degrees on the left half of the seventh to twelfth undercuts C7 to C12.

In the second embodiment, the undercut interval $\theta x$ different from the reference angle $\theta z$ is 88 degrees. In other words, the fourth undercut C4 is formed at the position of the fourth reference line L4a shifted by two degrees in the counterclockwise direction from the fourth reference line L4.

However, the undercut interval $\theta x$ that differs from the reference angle $\theta z$ is not limited to 88 degrees. That is, in the above case, the angle shifted in the counterclockwise direction from the fourth reference line L4 is not limited to two degrees.

The circumferential width of the third segment SG3 is limited so as not to be smaller than the value specified in advance when the deviation angle is too large and the fourth reference line L4a approaches the third reference line L3.

This means that the positive electrode brush B1 and the negative electrode brush B2 do not simultaneously contact the three segments of the third segment SG3 and the second and fourth segments SG2 and SG4, which are adjacent to the third segment SG3. The deviation angle is limited within a predetermined range to set the circumferential width of the third segment SG3 so that the positive electrode brush B1 and the negative electrode brush B2 do not simultaneously contact the three segments.

Figure 8:
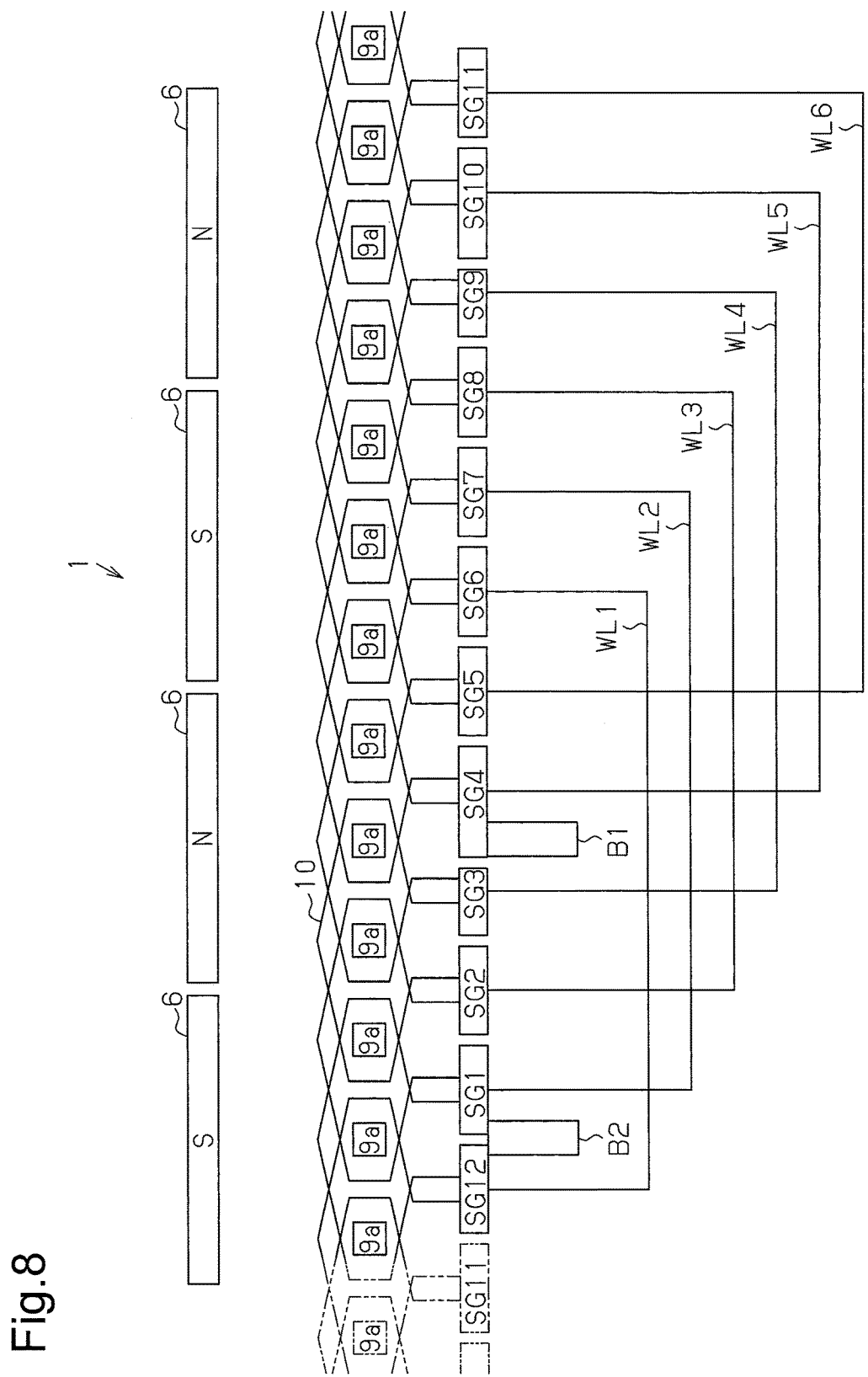
FIG. 8 is a spread out diagram showing a winding method for the motor of FIG. 7.

As shown in FIG. 8, the winding 10 of the brushed motor 1 of the second embodiment is also wound in a lap winding.

The operation of the brushed motor 1 will now be described.

In the brushed motor 1, the brush arrangement angle $\theta b$ formed by the positive electrode brush B1 and the negative electrode brush B2 is 90 degrees. Thus, the positive electrode and negative electrode brushes B1 and B2 do not simultaneously traverse the adjacent segment SG each time the rotation shaft 8 is rotated 30 degrees. That is, there are cases in which the positive electrode and negative electrode brushes B1 and B2 simultaneously traverse the adjacent segment SG and the positive electrode and negative electrode brushes B1 and B2 do not simultaneously traverse the adjacent segment SG Thus, the number of times the positive electrode and negative electrode brushes B1 and B2 simultaneously traverse the adjacent segment SG for each rotation of the rotation shaft 8 is small.

Thus, the fluctuation width of the current value supplied to the winding 10 can be reduced compared to when the number of times the brushes simultaneously traverse is large. As a result, the excitation force of the brushed motor 1 can be dispersed, and the vibration and the abnormal noise can be reduced.

Furthermore, in the first to twelfth segments SG1 to SG12, two sets of undercut intervals $\theta x$, which differ from the reference angle $\theta z$ (=90 degrees) defined in the brushed motor 1 having four poles and 12 segments, are set.

That is, among the first to twelfth segments SG1 to SG12, the circumferential widths of the third and ninth segments SG3 and SG9 arranged at the positions corresponding to the unequal pitch of 28 degrees are shorter than the circumferential width of the segment SG arranged at the positions corresponding to the equal pitch of 30 degrees. Furthermore, the circumferential widths of the fourth and tenth segments SG4 and SG10 arranged at the positions corresponding to the unequal pitch of 32 degrees are longer than the circumferential width of the segments SG arranged at the position corresponding to the equal pitch of 30 degrees.

Therefore, abnormal noise generated by the force received by each segment SG1 to SG12 from the positive electrode and negative electrode brushes B1 and B2 during rotation is not maximized but averaged, and the abnormal noise level can be lowered.

The second embodiment has the following advantages.

(1) In the embodiment described above, in the brushed motor 1 having four poles and twelve segments, the brush arrangement angle $\theta b$ formed by the positive electrode brush B1 and the negative electrode brush B2 is 90 degrees. Thus, the number of times the positive electrode and negative electrode brushes B1 and B2 simultaneously traverse the adjacent segments SG for each rotation of the brushed motor 1 is reduced, thereby reducing the fluctuation width of the current value supplied to the winding 10. As a result, the brushed motor 1 disperses the excitation force and reduces the vibration and the abnormal noise.

(2) In the embodiment described above, two sets of undercut intervals $\theta x$ are used, which differ from the reference interval $\theta z$ defined for the brushed motor 1 having four poles and twelve segments.

Therefore, abnormal noise generated by the force received by each segment SG1 to SG12 from the positive electrode and negative electrode brushes B1 and B2 during rotation is not maximized but averaged, and the abnormal noise level is lowered.

(3) In the present embodiment, the voltage equalizing lines WL1 to WL6 connected between different segments SG are used to have one of each of the positive electrode brush B1 and the negative electrode brush B2. This lowers the occurrence rate of contact failures caused by brush vibration, and the desired unequal pitch contact is obtained in an ensured manner.

The second embodiment may be modified as described below.

In the second embodiment, the brush arrangement angle $\theta b$ formed by the positive electrode brush B1 and the negative electrode brush B2 is 90 degrees. As shown in FIG. 7, the positive electrode brush B1 shown by the solid line may be shifted as shown by the double-dashed line. In this case, preferably, the deviation angle $\theta y$ is changed within a range of $\theta y < (360 \text{ degrees}/2 \ Pz)$. In other words, the positive electrode brush B1 and the negative electrode brush B2 may be arranged at the locations specified by $\theta b + \theta y$.

The reference angle $\theta z$ is expressed with the following relational expression when the deviation angle is shifted by $\theta y$.

$$\theta z = (360 \text{ degrees}/Pz) \pm \theta y$$

In this case, at least one set of undercuts is used positioned at the undercut interval that differs from the reference undercut interval obtained from the above relational expression. In this case as well, the fluctuation width of the current value supplied to the winding 10 can also be reduced. As a result, the brushed motor 1 can disperse the excitation force and reduce vibration and abnormal noise.

In the second embodiment described above, the present invention is embodied in the brushed motor of four poles and twelve segments. However, the present invention does not have to be applied to the brushed motor 1 having four poles and twelve segments and may be applied to a brushed motor satisfying $N = Pz \times K$. K is a natural number that is either two or four or greater.

Third Embodiment

A third embodiment will now be described with reference to FIGS. 11 to 16.

The brushed motor 1 according to the third embodiment is the same as the brushed motor having four poles and ten segments described in the first embodiment. However, the method for forming ten undercuts for the ten segments SG differs from the first embodiment. Therefore, the formation position of the undercuts will be described for the sake of brevity.

Figure 11:
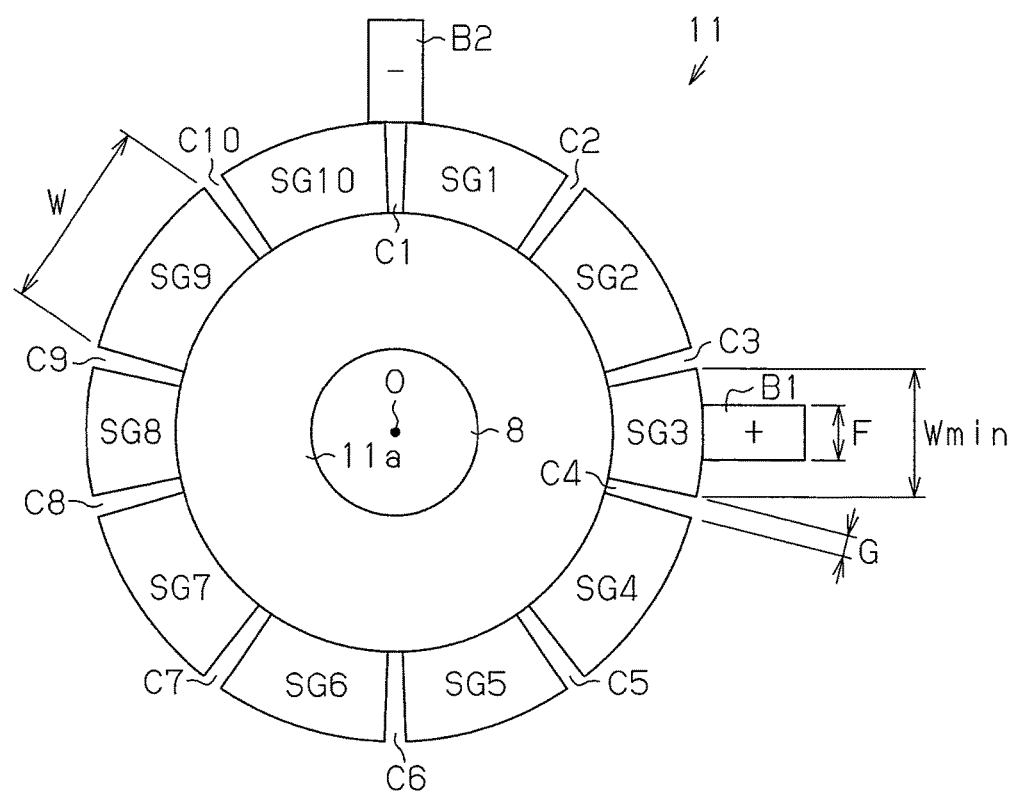
FIG. 11 is a front view taken in the axial direction of each segment of a brushed motor having four poles and ten segments according to a third embodiment of the present invention.

As shown in FIG. 11, the first to tenth segments SG1 to SG10 are fixed to the outer circumferential surface of the cylindrical insulating member 11a, which is fixed to the rotation shaft 8. The positive electrode brush B1 and the negative electrode brush B2 are separated from each other by 90 degrees in the circumferential direction about the center axis O of the rotation shaft 8.

Adjacent ones of the segments SG1 to SG10 are insulated by an undercut (groove). The ten undercuts, namely, first to tenth undercuts C1 to C10, have the same circumferential interval (undercut width G).

The first to tenth undercuts C1 to C10 are not located at equal angular intervals in the circumferential direction about the center axis O of the rotation shaft 8. That is, the first to tenth undercuts C1 to C10 are located at predetermined unequal angular intervals in the circumferential direction.

The formation positions of the first to tenth undercuts C1 to C10 are set based on the following two purposes. The first purpose is to reduce the abnormal noise generated by the force received from the positive electrode and negative electrode brushes B1 and B2 during rotation by each segment SG that slides in contact with the positive electrode and negative electrode brushes B1 and B2. The second purpose is to reduce changes in motor characteristics based on differences in the pitch pattern (passing timing when the brushes B1 and B2 pass by) of the undercut C during forward rotation and reverse rotation. The formation positions of the first to tenth undercuts C1 to C10 will be described later.

Since the first to tenth undercuts C1 to C10, which have the same undercut widths are formed at unequal angular intervals, the first to tenth segments SG1 to SG10 do not all have the same circumferential width (segment width W). Therefore, the first to tenth segments SG1 to SG10 include the segment SG with the segment width W that is minimal (minimum segment width Wmin).

Thus, the circumferential width (brush width) F of the slide-contact surface that slides in contact with the segment SG of the positive electrode and negative electrode brushes B1 and B2 is set with a constant relationship between the minimum segment width Wmin and the undercut width which will be described later. The brush widths F of the positive electrode and negative electrode brushes B1 and B2 have the same width.

Formation Position of Undercut C

The formation positions of the first to tenth undercuts C1 to C10 of when forming the ten segments SG of the commutator 11 will now be described.

Figure 13:
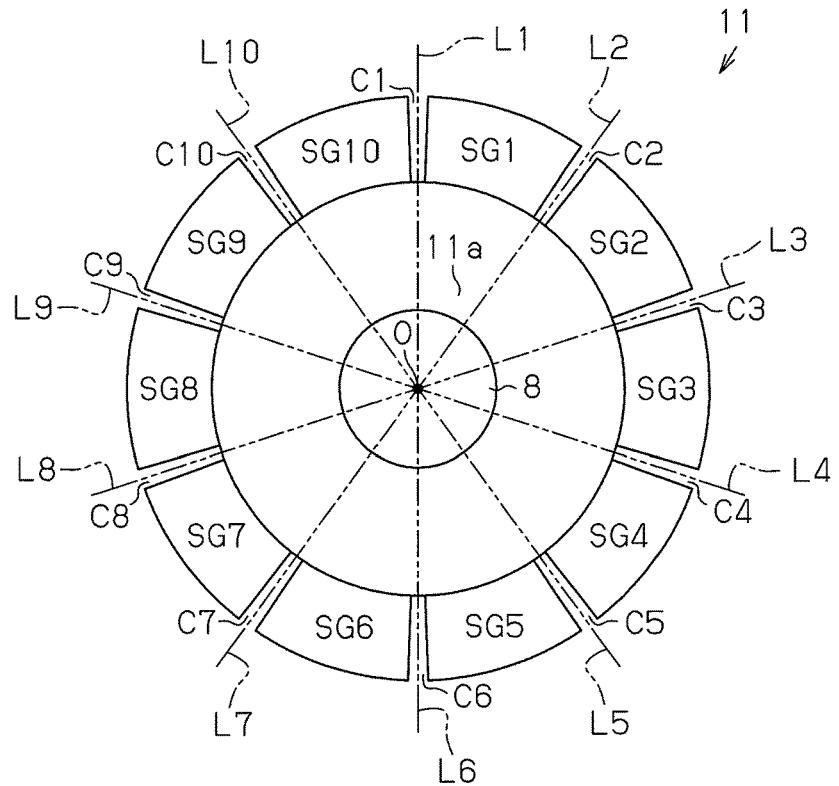
FIG. 13 is a front view of the conventional motor including undercuts formed at equal angular intervals taken in the axial direction.

FIG. 13 shows the positions of the first to tenth undercuts C1 to C10 in the prior art. The first to tenth undercuts C1 to C10 are formed at an interval (standard pitch) of an equal angle (=36 degrees) in the circumferential direction about the center axis O of the rotation shaft 8. In this case, lines extending through the circumferential center positions of each of the undercuts C1 to C10 from the center axis O of the rotation shaft 8 are referred to as the first to tenth reference lines L1 to L10 in order in the forward rotation direction.

Figure 12A:
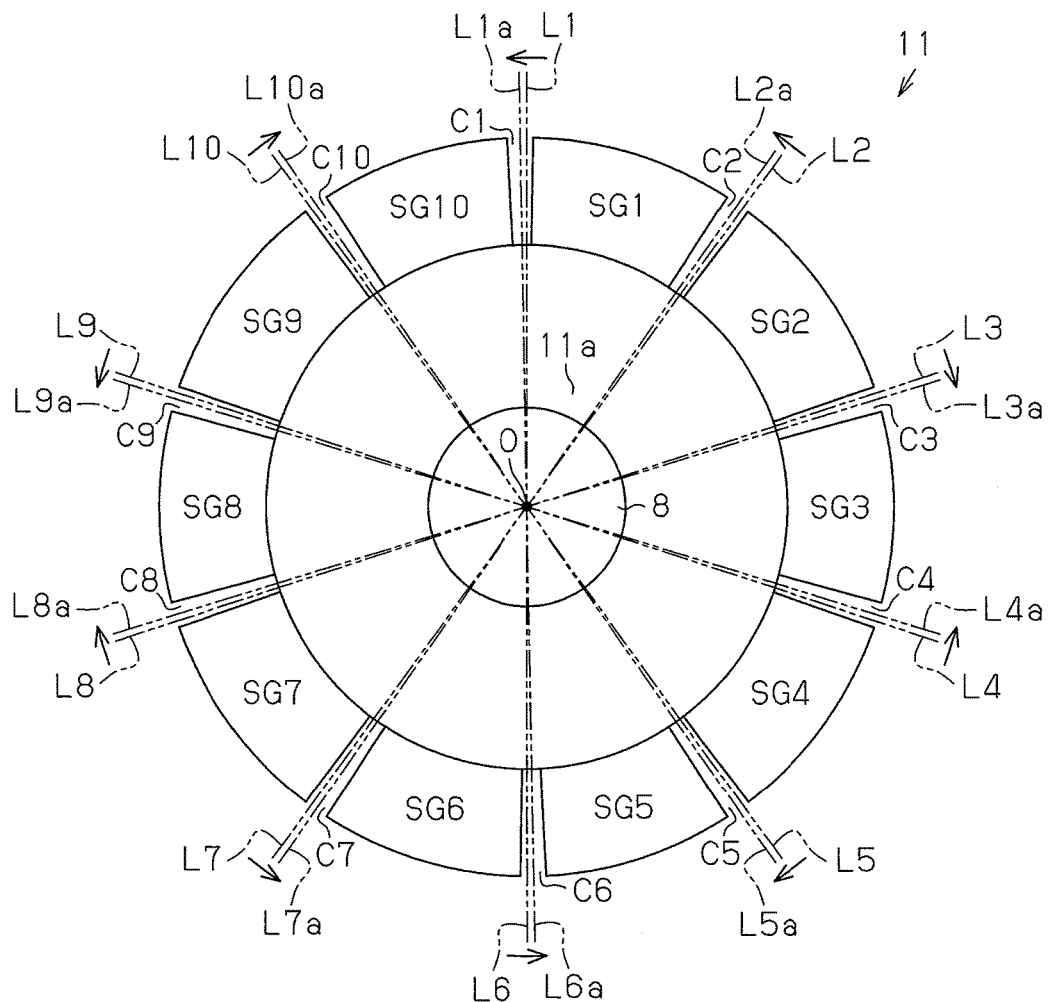
FIG. 12A is a front view taken from the axial direction of the motor of FIG. 11 showing undercuts formed at unequal angular intervals.

FIG. 12A shows the position of the first to tenth undercuts C1 to C10 of the third embodiment. The first to tenth undercuts C1 to C10 are formed at an unequal angular interval in the circumferential direction about the center axis O of the rotation shaft 8. In this case, lines extending through the circumferential center positions of each of the undercuts C1 to C10 from the center axis O of the rotation shaft 8 are referred to as the first to tenth reference lines L1a to L10a in order in the forward rotation direction.

As shown in FIG. 12A, the circumferential center position (first reference line L1a) of the first undercut C1 is shifted by one degree (=−1 degree) in the reverse rotation direction from the first reference line L1.

The circumferential center position (second reference line L2a) of the second undercut C2 is shifted by one degree (=−1 degree) in the reverse rotation direction from the second reference line L2.

The circumferential center position (third reference line L3a) of the third undercut C3 is shifted by one degree (=+1 degree) in the forward rotation direction from the third reference line L3.

The circumferential center position (fourth reference line L4a) of the fourth undercut C4 is shifted by one degree (=−1 degree) in the reverse rotation direction from the fourth reference line L4.

The circumferential center position (fifth reference line L5a) of the fifth undercut C5 is shifted by one degree (=+1 degree) in the forward rotation direction from the fifth reference line L5.

The circumferential center position (sixth reference line L6a) of the sixth undercut C6 is shifted by one degree (=−1 degree) in the reverse rotation direction from the sixth reference line L6.

The circumferential center position (seventh reference line L7a) of the seventh undercut C7 is shifted by one degree (=−1 degree) in the reverse rotation direction from the seventh reference line L7.

The circumferential center position (eighth reference line L8a) of the eighth undercut C8 is shifted by one degree (=+1 degree) in the forward rotation direction from the eighth reference line L8.

The circumferential center position (ninth reference line L9a) of the ninth undercut C9 is shifted by one degree (=−1 degree) in the reverse rotation direction from the ninth reference line L9.

The circumferential center position (tenth reference line L10a) of the tenth undercut C10 is shifted by one degree (=+1 degree) in the forward rotation direction from the tenth reference line L10.

The first to tenth undercuts C1 to C10 are thus formed at unequal angular intervals. As a result, abnormal noise generated by the force received by each segment SG, which slides in contact with the positive electrode and negative electrode brushes B1 and B2, from the positive electrode and negative electrode brushes B1 and B2 during forward and reverse rotation is not maximized but averaged.

Figure 12B:
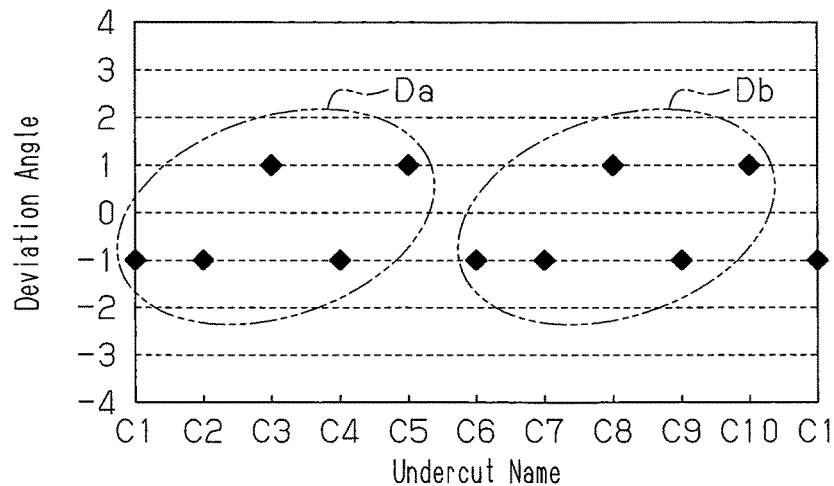
FIG. 12B is a graph showing a deviation angle of the undercuts from each reference line in FIG. 12A.

FIG. 12B is a graph showing the deviation angle from each reference line L1 to L10 in each undercut C1 to C10. The horizontal axis indicates each undercut C1 to C10, and the vertical axis indicates the deviation angle in the forward rotation direction with a positive value and indicates the deviation angle in the reverse rotation direction with a negative value of when each reference line L1 to L10 is assumed as zero degree.

The motor characteristics were tested based on the fact that the pitch pattern (passing timing) of the undercuts that passes by the brush differs depending on the rotating direction.

First, the total (hereinafter referred to as forward rotation side total) Z1 of the deviation angles of the ones of the undercuts C that takes a positive value is obtained. Furthermore, the total (hereinafter referred to as reverse rotation side total) Z2 of the deviation angles of the ones of the undercut C that takes a negative value is obtained. Then, a sum Z (=Z1+Z2) of the forward rotation side total Z1 and the reverse rotation side total Z2 is obtained.

As shown in FIGS. 12A and 12B, in the present embodiment, there are four undercuts C, the third, fifth, eighth, and tenth undercuts C3, C5, C8, C10, shifted by one degree (=+1 degree) in the forward rotation direction. The forward rotation side total Z1 of the deviation angles in the forward rotation direction of the undercuts C3, C5, C8, and C10 is +4 degrees.

On the contrary, there are six undercuts C, the first, second, fourth, sixth, seventh, and ninth undercuts C1, C2, C4, C6, C7, C9, shifted by one degree (=−1 degree) in the reverse rotation direction. The reverse rotation side total Z2 of the deviation angles in the reverse rotation direction of the undercuts C1, C2, C4, C6, C7, and C9 is −6 degrees.

As a result, in the case of the present embodiment, the sum Z (=Z1+Z2) is −2 degrees.

An index value Q for obtaining the motor characteristics of the motor will be defined as described below.

Index value $Q$=(sum $Z$/number of segments $N$)/number of pole pairs $P$

Through experiments, the value of the index value Q is changed, a no-load rotation speed with respect to the index value Q is obtained, and a no-load current with respect to the index value Q is obtained.

In this case, the value of the index value Q is changed by changing the sum Z with the number of segments N and fixing the number of pole pairs P. That is, with the number of segments N as ten and the number of pole pairs P as 2, the sum Z (=Z1+Z2) is changed to change the value of the index value Q.

Therefore, the unit of the index value Q is an angle. The index value Q is a +(positive) value when the sum Z is in the forward rotation direction, and the index value Q is a −(negative) value when the sum Z is in the reverse rotation direction.

Figure 14:
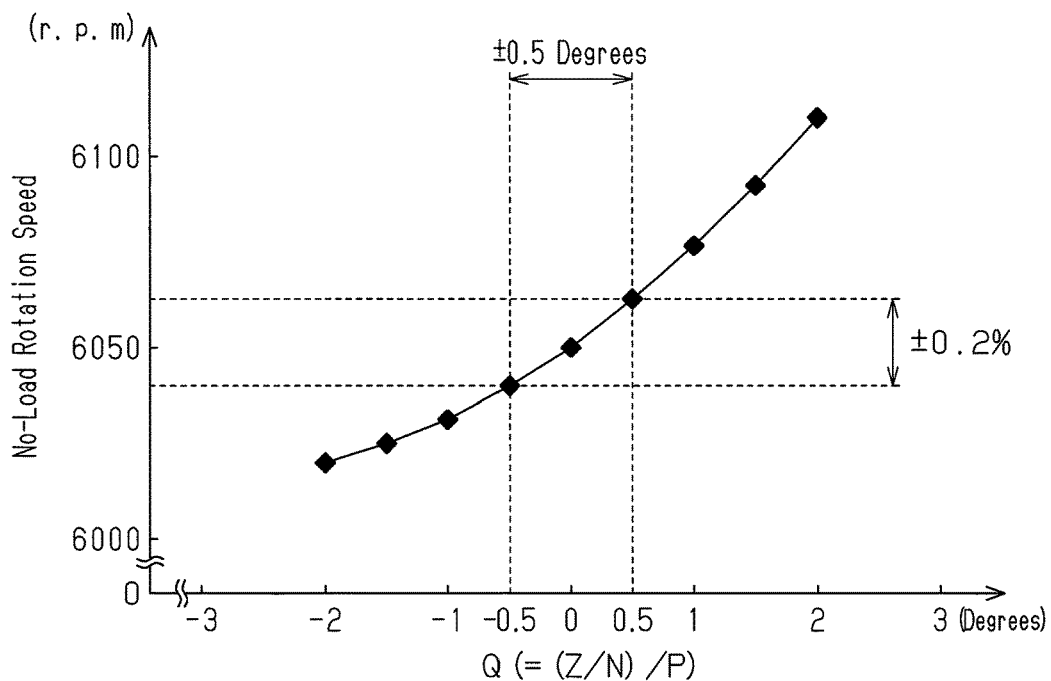
FIG. 14 is a graph showing a no-load rotation speed with respect to an index value in the motor of FIG. 11.

FIG. 14 is a graph showing the no-load rotation speed for the index value Q obtained through experiments, where the horizontal axis indicates the index value Q and the vertical axis indicates the no-load rotation speed (rpm).

FIG. 14 is a graph obtained by forward-rotating the brushed motor 1. When the brushed motor 1 is reverse-rotated, the rotation speed characteristic line of the index value Q has a shape symmetric with the rotation speed characteristic line of FIG. 14 with a line orthogonal to the position of zero degrees of the horizontal axis serving as a symmetrical axis. That is, when the experiments are conducted by reverse-rotating the brushed motor 1, the experiment result in which the index value Q of the horizontal axis of FIG. 14 is positive/negative-reversed is obtained.

As apparent from FIG. 14, the no-load rotation speed increases relative to the index value Q (=(sum Z/number of segments N)/number of pole pairs P). In other words, it can be seen that the no-load rotation speed increases as the sum Z increases from the negative value to the positive value.

When the brushed motor 1 is reverse rotated, the no-load rotation speed increases as the sum Z decreases from the positive value to the negative value.

In this case, taking into consideration individual differences such as manufacturing variations of the permanent magnet 6 and the armature core 9, the change in characteristics is limited within ±0.2%, which is the acceptable range, between the forward rotation and the reverse rotation with the no-load rotation speeds of when the index value Q of zero, that is, the sum Z of zero, is the center value.

The change in characteristics can be limited within ±0.2% if the index value Q is within the range of −0.5 degrees<Q<+0.5 degrees with zero degrees being the center value. In other words, even if the brushed motor 1 is rotated forward or reverse, the change in characteristics can be limited within ±0.2% as long as the index value Q is within the range of −0.5 degrees<Q<+0.5 degrees.

Figure 15:
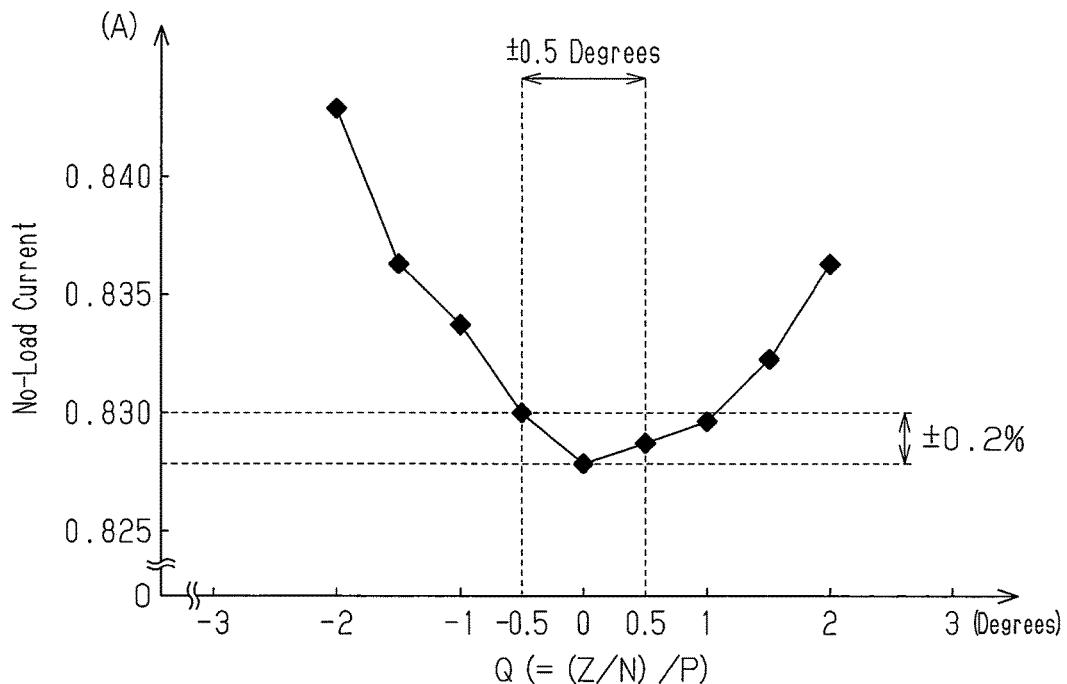
FIG. 15 is a graph showing a no-load current with respect to the index value in the motor of FIG. 11.

FIG. 15 is a graph showing the no-load current with respect to the index value Q obtained through experiments. The horizontal axis indicates the index value Q and the vertical axis indicates the no-load current (ampere).

FIG. 15 is a graph obtained by forward rotating the brushed motor 1. When the brushed motor 1 is reverse rotated, the current characteristic line of the index value Q has a shape symmetric with the current characteristic line of FIG. 15 with a line orthogonal to the position of zero degrees of the horizontal axis as a symmetrical axis. That is, when the experiments are conducted by reverse rotating the brushed motor 1, the experiment result is obtained in which the index value Q of the horizontal axis of FIG. 15 is positive/negative-reversed.

As apparent from FIG. 15, the no-load current increases relative to the index value Q (=(sum Z/number of segments N)/number pole pairs P). In other words, it can be seen that the no-load current increases toward the negative side and toward the positive side if the minimum value is when the sum Z is zero degrees.

In the same manner, when the brushed motor 1 is reverse-rotated, the no-load current increases toward the negative side and toward the positive side if the minimum value is when the sum Z is zero degrees.

As long as the index value Q is within the range of −0.5 degree<Q<+0.5 degree when zero degrees is the center value, the change in the no-load current is small (within ±0.2%). In other words, even if the brushed motor 1 is rotated forward and reverse, the change in the no-load current is small as long as the index value Q is within the range of −0.5 degrees<Q<+0.5 degrees.

Therefore, the change in the no-load current is small and the change in the no-load rotation speed can be limited within ±0.2% even if the brushed motor 1 is rotated forward and reverse by setting the index Q within the range of −0.5 degrees<Q<+0.5 degrees.

Thus, in the brushed motor 1 of the present embodiment, the sum Z is −2 degrees, the number of segments N is ten, and the number of pole pairs P is two.

Therefore, the index value Q (=(Z/N)/P) becomes −0.1 degrees. As a result, even if the brushed motor 1 is rotated forward and reverse, the change in the no-load current is small and the no-load rotation speed is within ±0.2%.

The ten undercuts C (C1 to C10) are collectively obtained for the sum Z (=Z1+Z2) in the above conditions of the index value Q.

Instead, the inner circumferential surface of 360 degrees in the circumferential direction formed by four (=2P) permanent magnets 6 is divided by the number of pole pairs P (=2) to define P (=2) inner circumferential surface regions in the circumferential direction. The sum Z is obtained for a group of successive undercuts C belonging to each inner circumferential surface region. In other words, the sum Z of the successive undercuts C arranged relative to the inner circumferential region facing each of the inner circumferential regions is obtained. The motor 1 is preferably configured such that the index value Q for each inner circumferential region is within ±0.5 degrees using the sum Z obtained for each inner circumferential surface region, that is, in the undercuts C belonging to the group and the number of segments N and the number of pole pairs P of the brushed motor 1.

That is, as shown by the double-dashed line in FIG. 12B, in the present embodiment, the inner circumferential surface of 360 degrees in the circumferential direction including the four permanent magnets 6 is divided by the number of pole pairs P (=2) into two inner circumferential regions, first and second inner circumferential regions Da and Db, of 180 degrees in the circumferential direction. The sums Za and Zb are obtained for the five undercuts C belonging to the first inner circumferential region Da and the second inner circumferential region Db. Next, using the sums Za and Zb obtained for each of the first and second inner circumferential regions Da and Db, an index value Qa (=(Za/N)/P) for the first inner circumferential surface region Da is obtained, and an index value Qb (=(Zb/N)/P) for the second inner circumferential surface region Db.

The motor 1 is preferably configured such that the index values Qa and Qb for each of the first and second inner circumferential regions Da and Db are each within ±0.5 degrees.

Although this is an extreme example, the purpose is to exclude the formation of the undercut C when the deviation angles of the five successive undercuts C arranged to face the first inner circumferential region Da are all in the forward rotation direction and the deviation angles of the five successive undercuts C arranged to face the second inner circumferential surface region Db are all in the reverse rotation direction.

Figure 16:
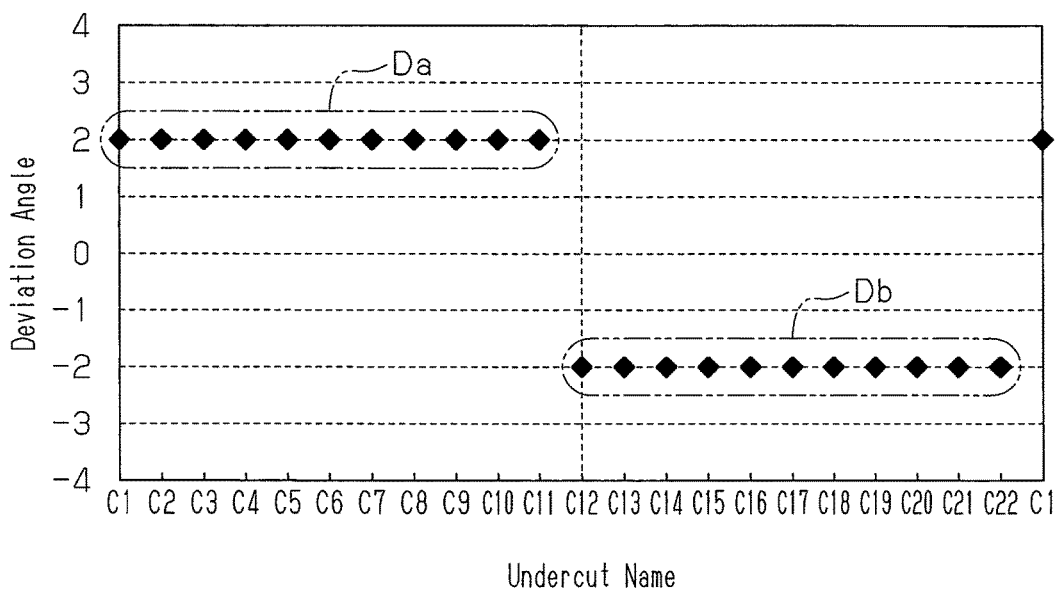
FIG. 16 is a graph showing a deviation angle of each undercut illustrating an extreme example of the undercuts arranged at an unequal angular interval.

FIG. 16 shows an extreme example using the motor of four poles and twenty-two segments. With the 22 undercuts C as first to twenty-second undercuts C1 to C22, such undercuts C are indicated on the horizontal axis of the graph of FIG. 16.

In this case, the index value Q satisfies the condition −0.5 degrees<Q<+0.5 degrees. However, the index values Qa and Qb become smaller than or equal to −0.5 degrees or greater than or equal to +0.5 degrees in each of the inner circumferential surface regions Da and Db.

In such a case, the switching (rectifying) timing of the current carried out in the brushes B1 and B2 and the segments SG differs at the positions of 360 degrees/number of pole pairs P. Thus, the timing of the magnetic excitation force of the brushed motor 1 shifts and becomes unbalanced. This results in an undesirable state in which vibration and noise are generated.

In order to prevent such a situation from occurring, the index values Qa and Qb for the first and second inner circumferential regions Da and Db are each set within, preferably, ±0.5 degrees.

In the case of the brushed motor 1 of the present embodiment, the inner circumferential surface of 360 degrees in the circumferential direction formed by four permanent magnets 6 is divided by the number of pole pairs P (=2) to be divided into two inner circumferential regions, namely, the first and second inner circumferential regions Da and Db of 180 degrees each in the circumferential direction. In this case, in the ten undercuts C1 to C10, the successive five undercuts C in the circumferential direction are arranged to face each of the first and second inner circumferential surface regions Da and Db. In other words, the five successive undercuts C belong to each of the first inner circumferential surface region Da and the second inner circumferential surface region Db. The five undercuts C arranged in the first inner circumferential surface region Da radially face the five undercuts C arranged in the second inner circumferential surface region Db.

As shown by the double-dashed line in FIG. 12B, the first to fifth undercuts C1 to C5 are arranged to face the first inner circumferential surface region Da, and the sixth to tenth undercuts C6 to C10 are arranged to face the second inner circumferential surface region Db.

In this case, the index value Qa (=Za/N)/P) is obtained using the first to fifth undercuts C1 to C5 in the first inner circumferential surface region Da.

In this case, as shown in FIG. 12B, there are two undercuts C, namely, the third and the fifth undercuts C3 and C5, in which the deviation angle is shifted by one degree (=+1 degree) in the forward rotation direction, in the first inner circumferential surface region Da. The forward rotation side total Z1a of the deviation angle in the forward rotation direction of the undercuts C3, C5 is +2 degrees.

In contrast, there are three undercuts C, namely, the first, second, and fourth undercuts C1, C2, and C4, in which the deviation angle is shifted by one degree (=−1 degree) in the reverse rotation direction. The reverse rotation side total Z2a of the deviation angle in the reverse rotation direction of the undercuts C1, C2, C4 is −3 degrees. As a result, the sum Za (=Z1a+Z2a) in the first inner circumferential surface region Da is −1 degree.

The index $Qa=((Za/N)/P)$ in the first inner circumferential surface region Da is −0.05 degrees.

The index value $Qb (=Zb/N)/P)$ is obtained using the sixth to tenth undercuts C6 to C10 in the second inner circumferential surface region Db.

In this case, as shown in FIG. 12B, three are two undercuts C, namely, the eighth and the tenth undercuts C8 and C10, in which the deviation angle is shifted by one degree (=+1 degree) in the forward rotation direction in the second inner circumferential surface region Db. The forward rotation side total $Z1b$ of the deviation angle in the forward rotation direction of the undercuts C8 and C10 is +2 degrees.

On the other hand, there are three undercuts C, namely, the sixth, seventh, and ninth undercuts C6, C7, and C9, in which the deviation angle is shifted by one degree (=−1 degree) in the reverse rotation direction. The reverse rotation side total $Z2b$ of the deviation angle in the reverse rotation direction of the undercuts C6, C7, and C9 is −3 degrees. As a result, the sum $Zb (=Z1b+Z2b)$ in the second inner circumferential surface region Db is −1 degree.

The index $Qb (=(Zb/N)/P)$ in the second inner circumferential surface region Db is −0.05 degrees.

Therefore, the brushed motor 1 of the present embodiment reduces the generation of vibration and noise that would be caused by an imbalance resulting from shifting of the timing of the magnetic excitation force of the brushed motor 1 by the switching (rectifying) timing of the current carried out in the brushes B1 and B2 and the segments SG.

Setting of Brush Width F, Minimum Segment Width Wmin, and Undercut Width G

However, since the undercuts C1 to C10 are arranged at unequal angular intervals, the following two problems may occur.

The first problem is in that the positive electrode brush B1 and the negative electrode brush B2, spaced apart by 90 degrees, simultaneously traverse the undercut C thereby adversely affecting the motor characteristics.

The second problem is in that the positive electrode brush B1 and the negative electrode brush B2 spaced apart by 90 degrees simultaneously contact three segments, namely, the segment SG having the minimum segment width Wmin and the segments SG that are adjacent to the segment SG, thereby adversely affecting the motor characteristics.

The first problem occurs when the number of slots in the motor is not dividable by the number of magnetic poles, that is, when the slots cannot be equally distributed for each magnetic pole. The motor in which the slots cannot be distributed in equal numbers for each magnetic pole has the superior effect for reducing torque fluctuation or for raising the rectifying effect.

In contrast, the second problem occurs when the number of slots in the motor is dividable by the number of magnetic poles, in other words, the motor in which the slots can be equally distributed to each magnetic pole. The motor in which the slots can be equally distributed to each magnetic pole has the superior effect of outputting high torque.

The brushed motor 1 of the present embodiment is a motor in which the number of slots is ten and the number of magnetic poles Pz is four (=2P). When the number of slots is divided by the number of magnetic poles, the value of 2.5 is obtained. Thus, the slots cannot be equally distributed to each magnetic pole. This may cause the first problem.

In the present embodiment, the brush width F is set to satisfy the following conditions for the relationship of the minimum segment width Wmin and the undercut width G so that the first problem does not arise.

$$(Wmin+2\times G)/2 > 0.8\times F$$

The brush width F is 0.8 times. The brush width F is set to be 0.8 times in view of the actual contact width in the circumferential direction of the positive electrode and negative electrode brushes B1 and B2 of the brushed motor 1 that rotates forward and reverse.

Furthermore, the segments SG having the minimum segment width Wmin is four segments, namely, the third, fifth, eight, and tenth segments SG3, SG5, SG8, and SG10, as shown in FIGS. 11 and 12.

When setting the brush width F to a width that satisfies the above condition, the positive electrode brush B1 and the negative electrode brush B2 do not simultaneously traverse the undercut C, and the motor characteristics are thus not adversely affected.

The operation of the brushed motor 1 will now be described.

Since each of the undercuts C1 to C10 formed between adjacent ones of the ten segments SG are formed at unequal angular intervals, abnormal noise generated by the force received from the positive electrode and negative electrode brushes B1 and B2 during rotation is not maximized but averaged. This lowers the abnormal noise level.

Furthermore, in the brushed motor 1 in which the number of segments N is ten and the number of pole pairs P is two, the motor 1 is configured such that the sum $Z (=Z1+Z2)$ is −2 degrees and the index value $Q (=(Z/N)/P)$ is −0.1 degrees. Thus, the index value Q falls within the range of −0.5 degrees<Q<+0.5 degrees, the change in the no-load current becomes small (within ±0.2%), and the change in the no-load rotation speed falls within ±0.2% when the brushed motor 1 is rotated forward and reverse.

Furthermore, the inner circumferential surface of 360 degrees in the circumferential direction formed by the four permanent magnets 6 is divided by the number of pole pairs P (=2) into the two inner circumferential regions Da and Db of 180 degrees in the circumferential direction. The successive five undercuts C during rotation are arranged to face each of the two inner circumferential surface regions Da and Db. The sums Z of the five undercuts C facing the two inner circumferential regions Da and Db are set within ±0.5 degrees.

Thus, the timing of the magnetic excitation force of the brushed motor 1 based on the switching (rectifying) timing of the current carried out in the brushes B1 and B2 and the segments SG does not shift. This reduces the vibration and noise generated by the imbalance in the timing of the magnetic excitation force of the brushed motor 1.

Moreover, the brushed motor 1 is a motor in which the number of slots is ten and the number of magnetic poles is four (=2P), and the slots cannot be equally distributed to each magnetic pole. Thus, the brush width F is set to satisfy $(Wmin+2\times G)/2>0.8\times F$ in the relationship with the minimum segment width Wmin and the undercut width G As a result, the positive electrode brush B1 and the negative electrode brush B2 do not simultaneously traverse the undercut C.

The third embodiment has the following advantages.

(1) In the present embodiment, the undercuts C1 to C10 formed in the ten segments, namely, the first to tenth segments SG1 to SG10, are formed at unequal angular intervals. This lowers the abnormal noise level of the abnormal noise generated by the force received from the positive electrode and negative electrode brushes B1 and B2 during rotation.

(2) In the brushed motor 1 of the present embodiment, the number of segments N is ten and the number of pole pairs P is two, the sum Z (=Z1+Z2) is −2 degrees and the index value Q is −0.1 degrees, which is within the range of −0.5 degrees<Q<+0.5 degrees. Therefore, when the brushed motor 1 is rotated forward and reverse, the change in the no-load current is small (within ±0.2%) and the change in the no-load rotation speed is within ±0.2%.

(3) In the present embodiment, the inner circumferential surface of 360 degrees in the circumferential direction formed by four permanent magnets 6 is divided by the number of pole pairs P (=2) into the two inner circumferential surface regions Da and Db of 180 degrees in the circumferential direction. With the sum Za of the five undercuts C facing the inner circumferential surface region Da set to −1 degree and the sum Zb set to +1 degree, the respective index values Qa and Qb are set within the range of ±0.5 degrees. Therefore, the timing of the magnetic excitation force of the brushed motor 1 based on the switching (rectifying) timing of the current carried out in the brushes B1 and B2 and the segment SG does not shift. This reduces the vibration and noise generated by the imbalance in the timing of the magnetic excitation force of the brushed motor 1.

(4) In the present embodiment, the brushed motor 1 is a motor in which the number of slots is ten and the number of magnetic poles is four (=2P), and the slots cannot be equally distributed to each magnetic pole. The brush width F is set to satisfy (Wmin+2×G)/2>0.8×F in the relationship with the minimum segment width Wmin and the undercut width G Thus, the positive electrode and negative electrode brushes B1 and B2 do not simultaneously traverse the undercut C. Therefore, the motor characteristics are not adversely affected when the positive electrode brush B1 and the negative electrode brush B2 simultaneously traverse the adjacent segments SG.

The third embodiment may be modified as described below.

In the third embodiment described above, the number of slots is not dividable by the number of magnetic poles in the motor (motor in which the slots cannot be equally distributed to each magnetic pole), the brush width F is set to satisfy (Wmin+2×G)/2>0.8×F in the relationship with the minimum segment width Wmin and the undercut width G.

In this respect, when the number of slots is dividable by the number of magnetic poles in a motor (motor in which the slots can be equally distributed to each magnetic pole), the brush width F may be set as described below.

Figure 17:
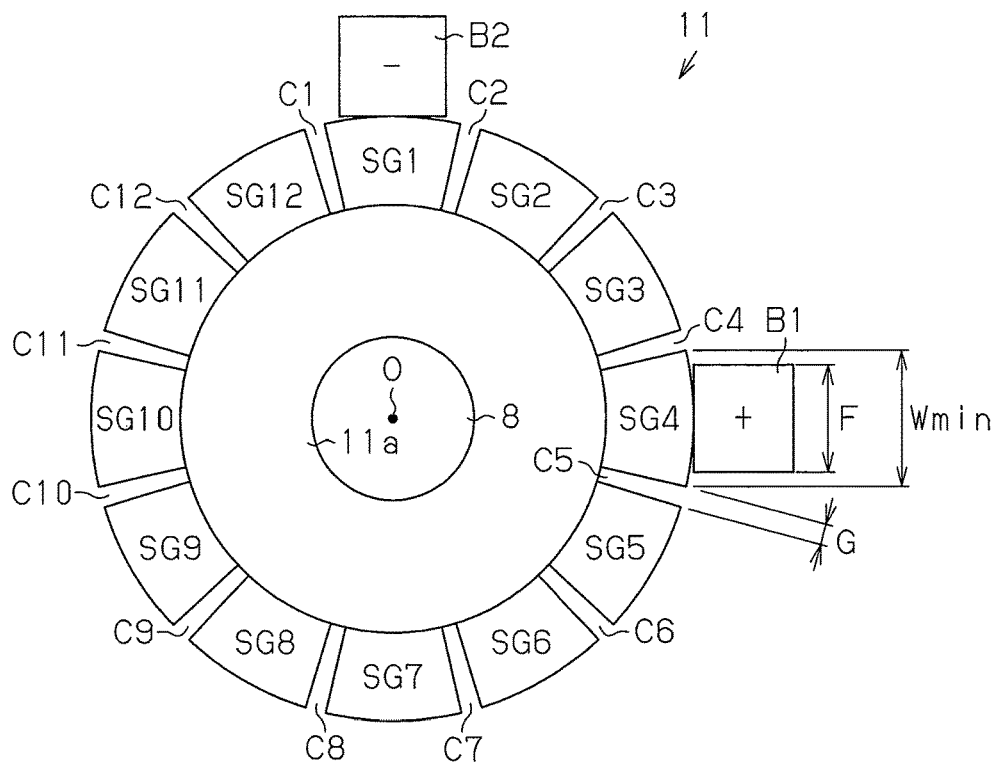
FIG. 17 is a front view taken in the axial direction showing another example of a brushed motor and the arrangement of the brush and the segments of the motor, in which the number of slots is dividable by the number of magnetic poles.

For example, FIG. 17 shows a motor including twelve segments SG twelve slots, and four magnetic poles. In this case, the number of slots (=12) is dividable by the number of magnetic poles (=4), and the slots can be equally distributed to each magnetic pole. In the case of the brushed motor 1, the positive electrode brush B1 and the negative electrode brush B2 cannot simultaneously contact three segments, namely, the segment having the minimum segment width Wmin and two segments SG adjacent to the segment.

In this case, the brush width F is set to satisfy the following condition in the relationship with the minimum segment width Wmin and the undercut width G.

$$(W\mathrm{min}+2\times G)>0.8\times F$$

Thus, the positive electrode brush B1 and the negative electrode brush B2 do not simultaneously contact the three segments SG namely, the segment SG having the minimum segment width Wmin and the two segments adjacent to the segment SG Thus, the motor characteristics are not adversely affected by the simultaneously contact.

In the third embodiment described above, the present invention is embodied in the brushed motor 1 in which the number of pole pairs P is two. However, the present invention may be applied to, for example, a brushed motor having six poles and twenty-one segments (21 slots) in which the number of polar pairs P is three.

Figure 18:
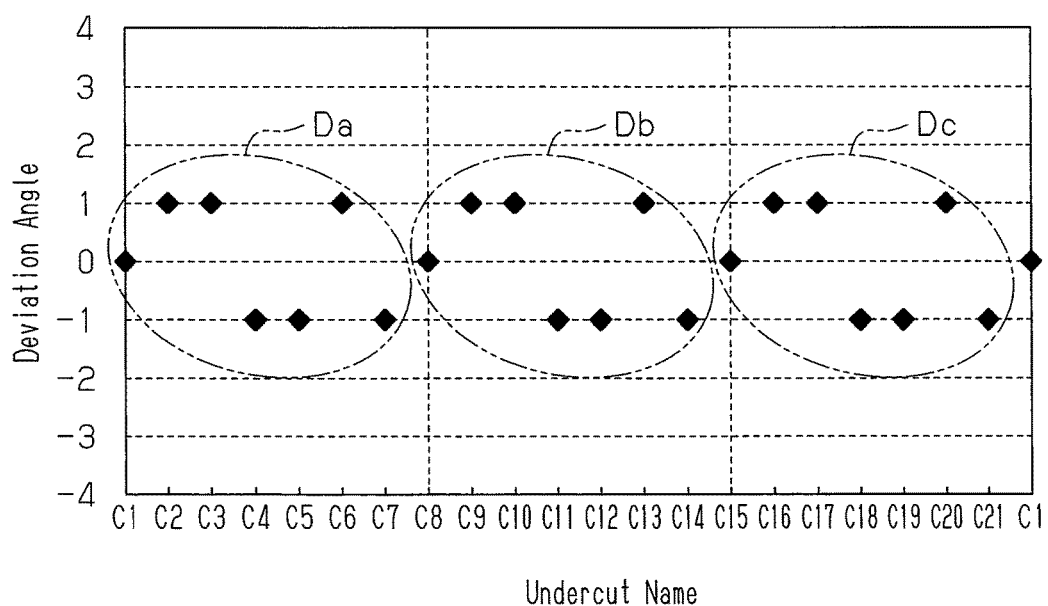
FIG. 18 is a graph for another example of a brushed motor in which the deviation angle from each reference line in the undercuts of each inner circumferential surface region of the motor, the number of pole pairs of which is three.

In this case, as shown in the graph of FIG. 18, the inner circumferential surface of 360 degrees in the circumferential direction formed by six permanent magnets 6 is divided by the number of pole pairs P (=3) into three inner circumferential regions, namely, first to third inner circumferential surface regions Da, Db, and Dc of 120 degrees in the circumferential direction. The 21 undercuts C are referred to as the first to twenty-first undercuts C1 to C21, and the undercuts C are indicated on the horizontal axis of the graph of FIG. 18.

The sums Da, Db, and Dc were obtained for the seven successive undercuts C facing each of the inner circumferential regions Da, Db, and Dc, respectively. Next, an index value Qa (=(Za/N)/P) for the first inner circumferential surface region Da was obtained. An index value Qb (=(Zb/N)/P) for the second inner circumferential surface region Db was obtained. An index value Qc (=(Zc/N)/P) for the third inner circumferential surface region Dc was obtained.

The motor 1 is configured so that the index values Qa, Qb, and Qc for each of the first to third inner circumferential surface regions Da, Db, and Dc are each within ±0.5 degrees.

The brushed motor 1 is a motor in which the number of slots is not dividable by the number of magnetic poles, and thus the brush width F needs to be set to satisfy (Wmin+2×G)/2>0.8×F in the relationship with the minimum segment width Wmin and the undercut width G.

Figure 19:
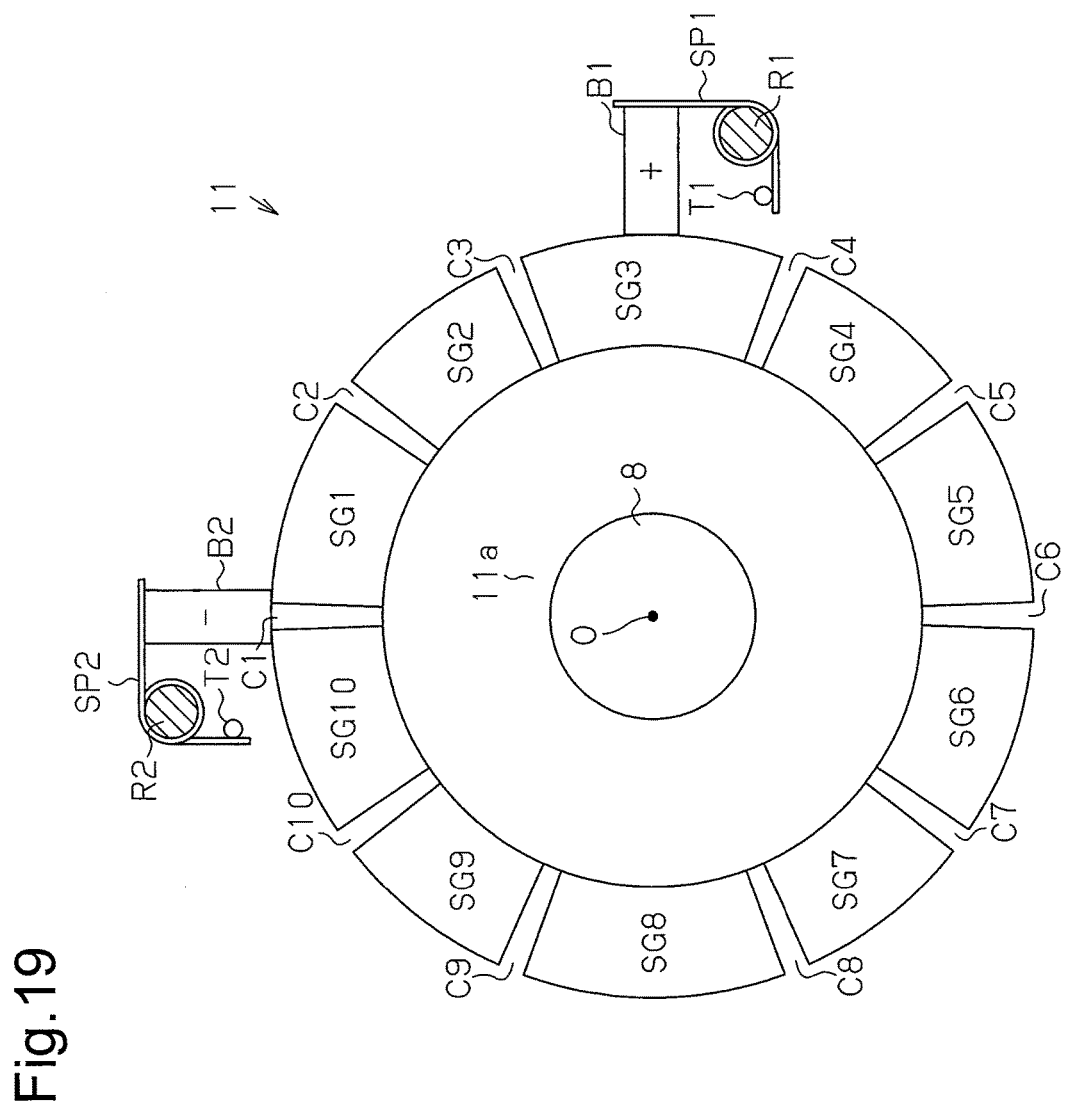
FIG. 19 is a front view taken in the axial direction of each segment in another example of the brushed motor.

In the first to third embodiments, as shown in FIG. 1, the positive electrode brush B1 and the negative electrode brush B2 are pushed toward the radially inner side by the compression coil spring 19 arranged in the brush box 16. Instead, as shown in FIG. 19, the positive electrode and negative electrode brushes B1 and B2 may be pushed using first and second torsion springs SP1 and SP2, respectively. In this case, the first torsion spring SP1 is inserted and supported in a supporting column R1 extending from the base plate 15 located at the clockwise side in the circumferential direction of the positive electrode brush B1. When restricting clockwise rotation of one end of the first torsion spring SP1 with an engagement pin T1, the back surface of the positive electrode brush B1 is pushed toward the radially inner side with the other end of the first torsion spring SP1.

The second torsion spring SP2 is inserted and supported in a supporting column R2 extending from the base plate 15 located at the counterclockwise side in the circumferential direction of the negative electrode brush B2. When restricting rotation counterclockwise rotation of one end of the second torsion spring SP2 with an engagement pin T2, the back surface of the positive electrode brush B1 is pushed toward the radially inner side with the other end of the second torsion spring SP2.

In this case, the first torsion spring SP1 and the second torsion spring SP2 are symmetrically arranged with respect to a center line extending through the middle in the circumferential direction between the springs SP1 and SP2. Therefore, when the commutator 11 is rotated in the clockwise direction, the direction of the radial center axis of the negative electrode brush B2 deviates in the clockwise direction by the pushing of the second torsion spring SP2. Therefore, the pressure at which the negative electrode brush B2 slides in contact with each segment SG can be reduced and the brush vibration can be reduced. In contrast, when the commutator 11 is rotated in the counterclockwise direction, the direction of the radial center axis of the positive electrode brush B1 deviates in the counterclockwise direction by the pushing of the first torsion spring SP1. Therefore, the pressure at which the positive electrode brush B1 slides and contacts each segment SG can be reduced and the brush vibration can be reduced.

The invention claimed is:

1. A brushed motor comprising:
   a rotation shaft;
   a commutator fixed to the rotation shaft, wherein the commutator includes a plurality of segments insulated and separated by a plurality of undercuts, and the plurality of undercuts are arranged at unequal angular intervals about a center axis of the rotation shaft;
   an armature fixed to the rotation shaft;
   a plurality of permanent magnets located at an outer side of the armature, wherein the plurality of permanent magnets are arranged at equal intervals so that directions of magnetic poles differ in adjacent ones of the permanent magnets;
   a voltage equalizing line that connects different ones of the segments; and
   a positive electrode brush and a negative electrode brush arranged on an outer circumference of the commutator at positions that are not facing each other;
   wherein when Pz is the number of the permanent magnets and N is the number of the segments, a relationship of $N=Pz(K1-0.5)$ is satisfied, where Pz is an even number that is greater than or equal to four, K1 is a constant and is a natural number that is greater than or equal to two, and the plurality of undercuts includes at least one set of undercuts arranged at an undercut interval that differs from a reference angle $\theta z$, the reference angle $\theta z$ is specified by a relational expression of $\theta z = (360 \text{ degrees}/Pz) \pm (360 \text{ degrees}/2N)$, and the plurality of undercuts includes a plurality of pairs of the undercuts separated by 360 degrees/the number of pole pairs of the magnetic poles of the permanent magnets.

2. The brushed motor according to claim 1, wherein when $\theta b$ is a brush arrangement angle and $\theta y$ is a deviation angle, the positive electrode brush and the negative electrode brush are arranged at positions separated by, $\theta b + \theta y$, $\theta b = 360 \text{ degrees}/(Pz \times K2)$ is satisfied, wherein K2 is a constant and a natural number, $\theta y < 360 \text{ degrees}/2Pz$ is satisfied, and the reference angle $\theta z$ is specified by a relational expression of $\theta z = (360 \text{ degrees}/Pz) \pm (360/2N) \pm \theta y$.

* * * * *